May 31, 1960 — J. V. O'GRADY ET AL — 2,938,604
ELEVATOR CONTROL SYSTEM
Filed Dec. 24, 1958 — 19 Sheets-Sheet 2
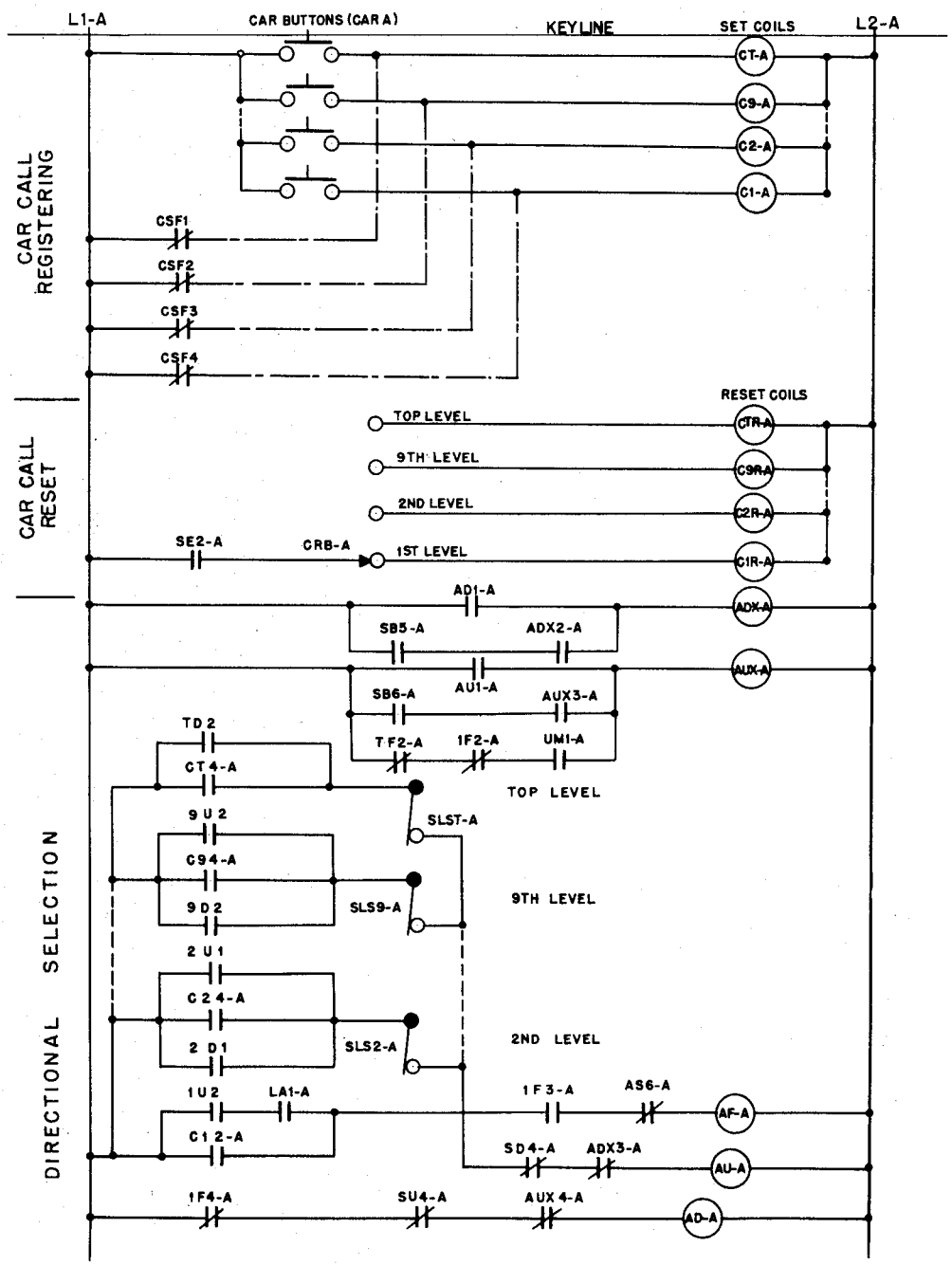
FIG. II
INVENTORS
Joseph V. O'Grady
Donald T. Moynihan
By their attorneys
Howson and Howson

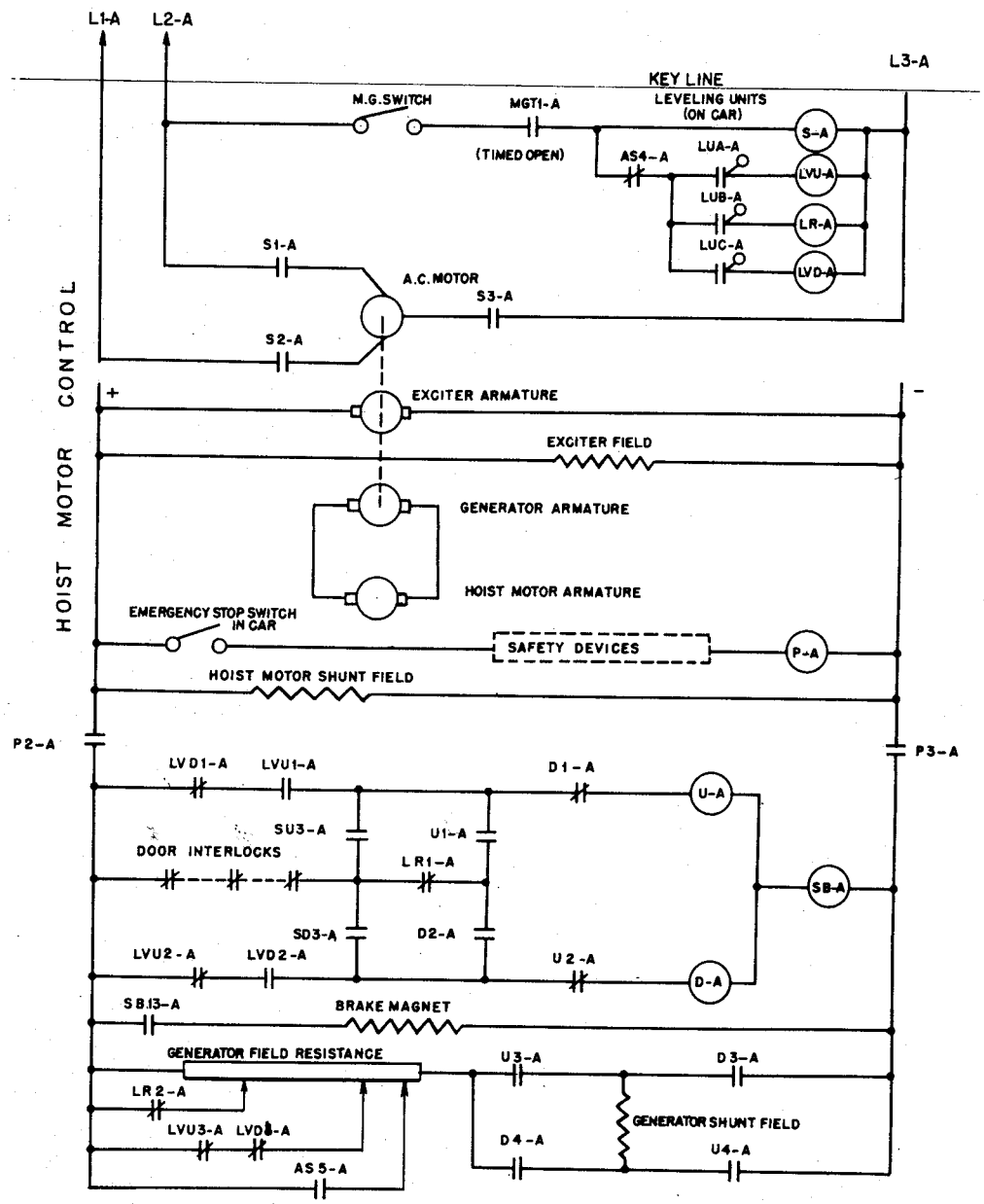
FIG. I

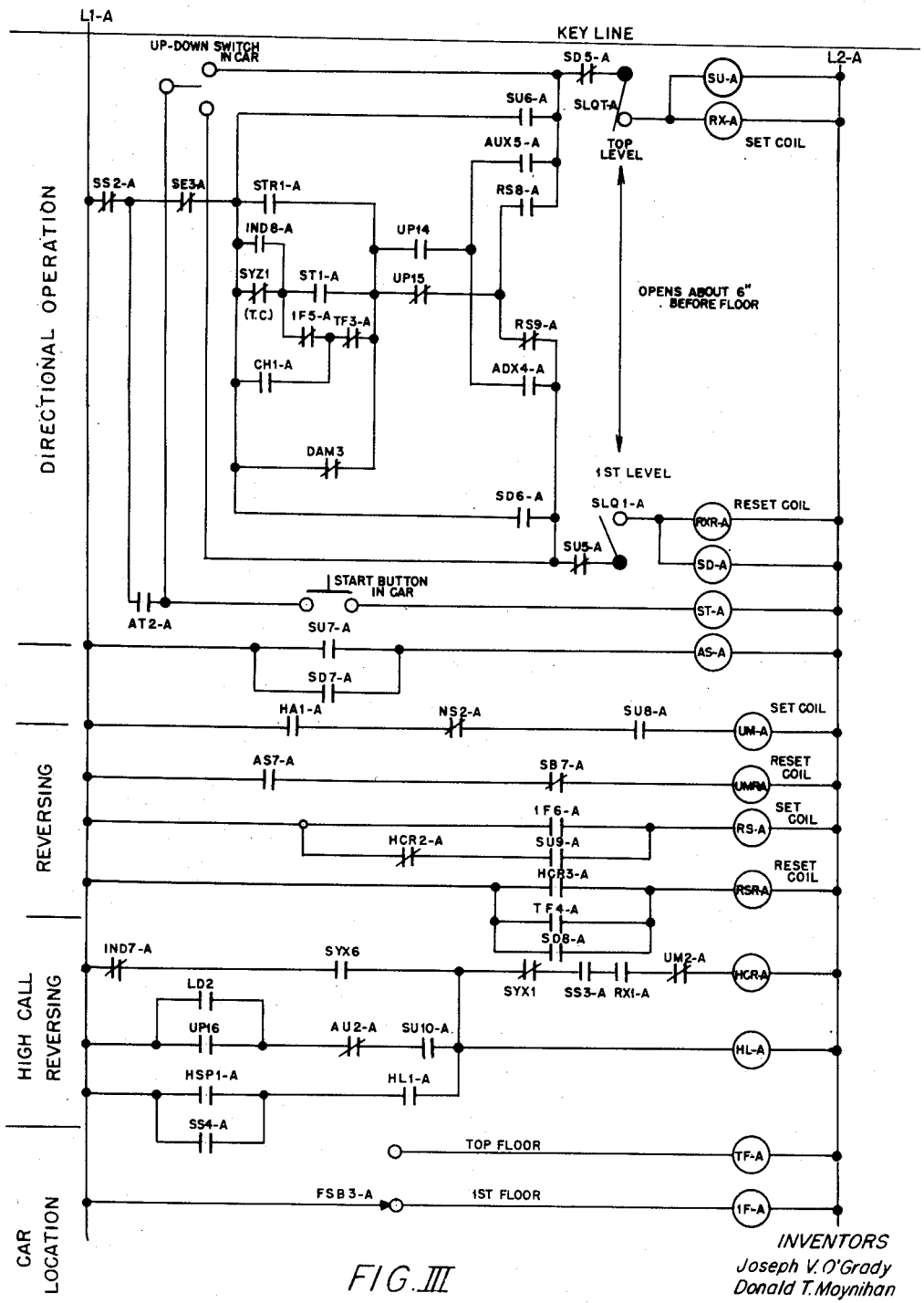
FIG. III

May 31, 1960 — J. V. O'GRADY ET AL — 2,938,604
ELEVATOR CONTROL SYSTEM
Filed Dec. 24, 1958 — 19 Sheets-Sheet 4
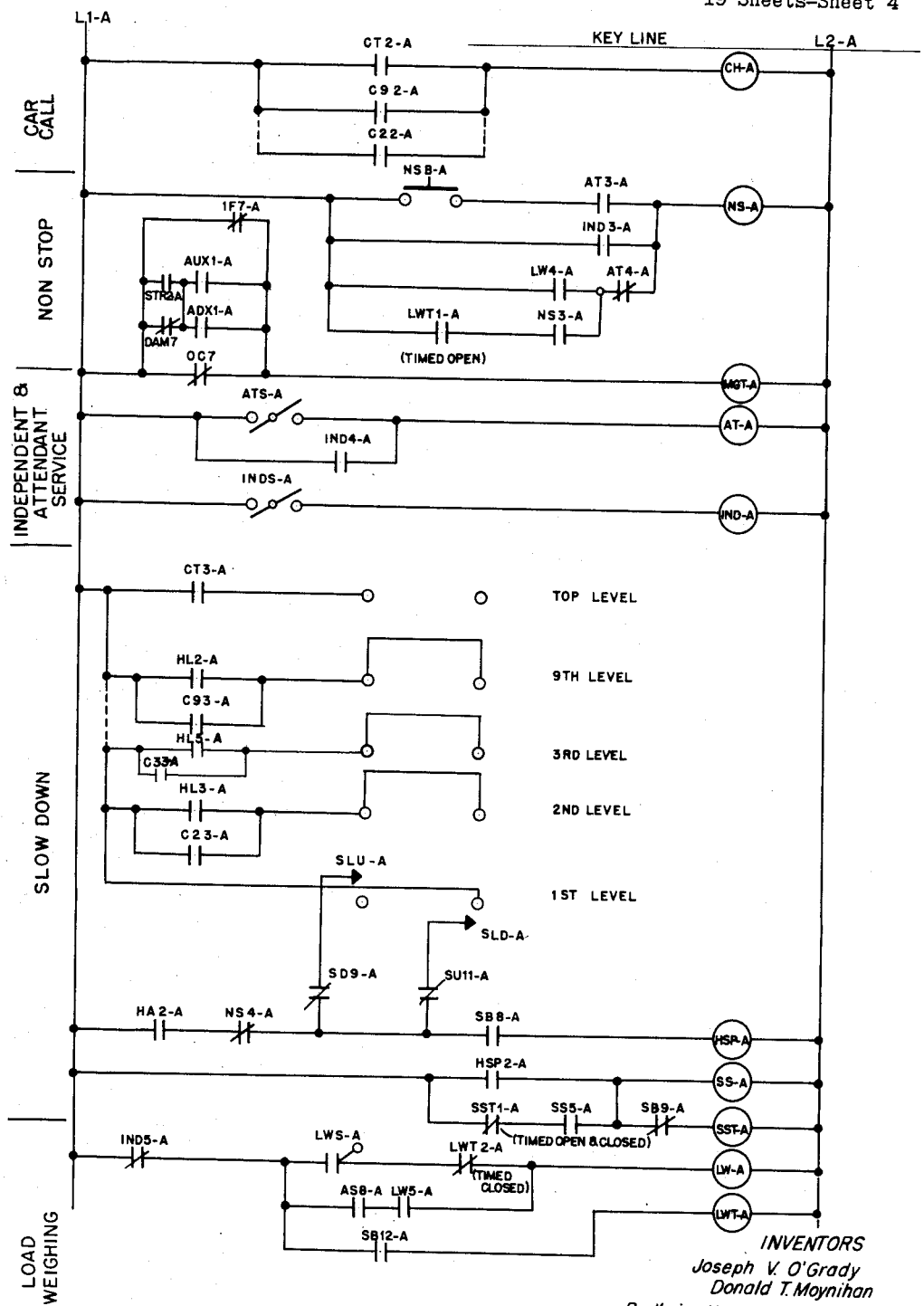
FIG. IV
INVENTORS
Joseph V. O'Grady
Donald T. Moynihan
By their attorneys
Howson and Howson May 31, 1960 J. V. O'GRADY ET AL 2,938,604
ELEVATOR CONTROL SYSTEM
Filed Dec. 24, 1958 19 Sheets-Sheet 5
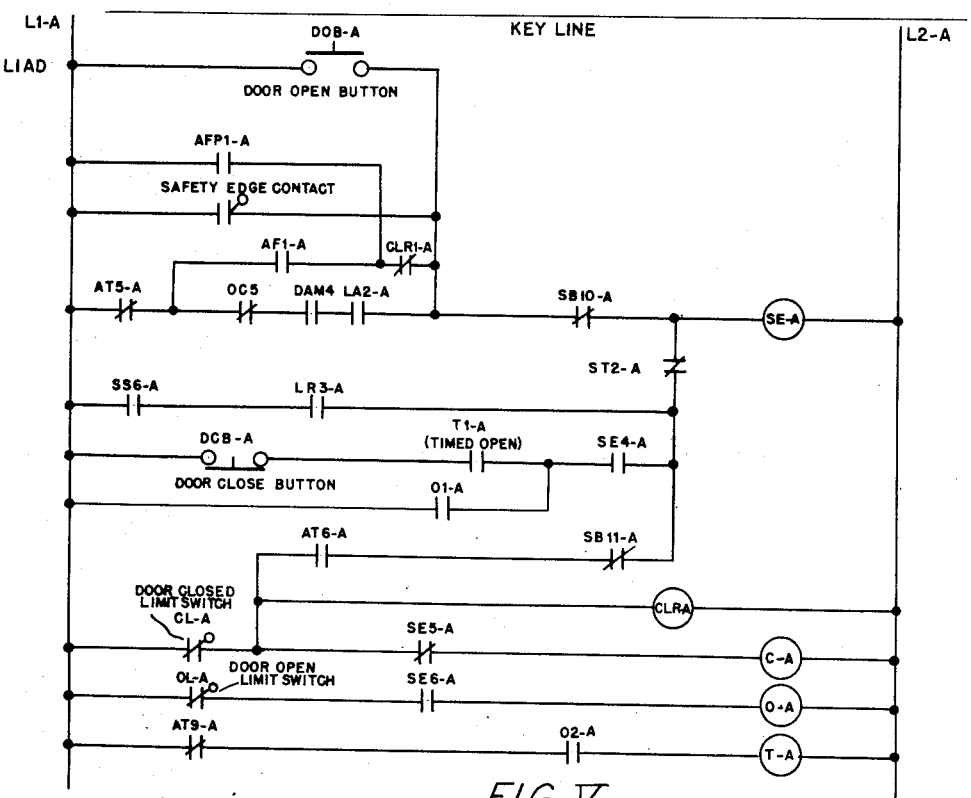
FIG. V
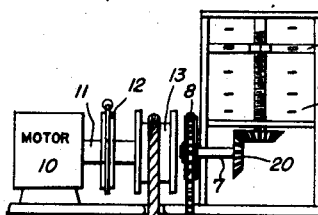
FIG. XVI
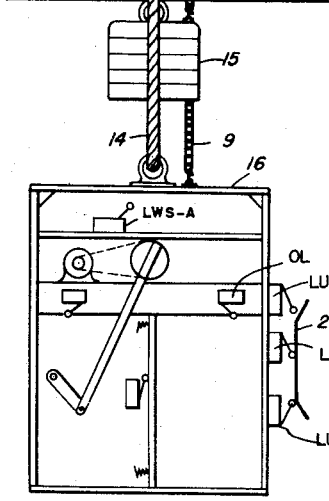
FIG. XIV
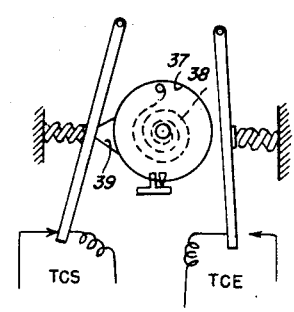
FIG. XV
INVENTORS
Joseph V. O'Grady
Donald T. Moynihan
By their attorneys
Howson and Howson May 31, 1960 — J. V. O'GRADY ET AL — 2,938,604
ELEVATOR CONTROL SYSTEM
Filed Dec. 24, 1958
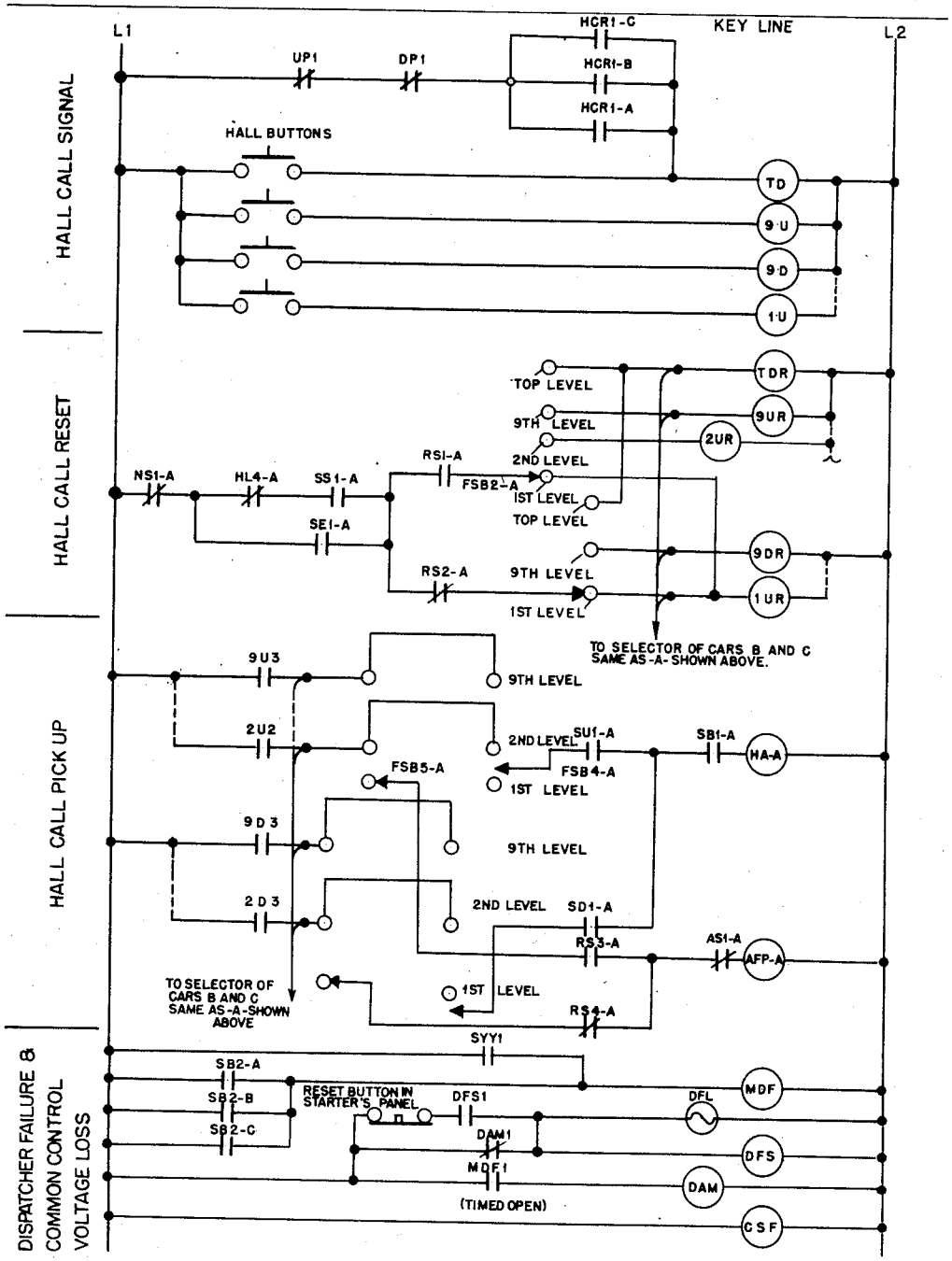
FIG. VI
INVENTORS
Joseph V. O'Grady
Donald T. Moynihan
By their attorneys
Howson and Howson

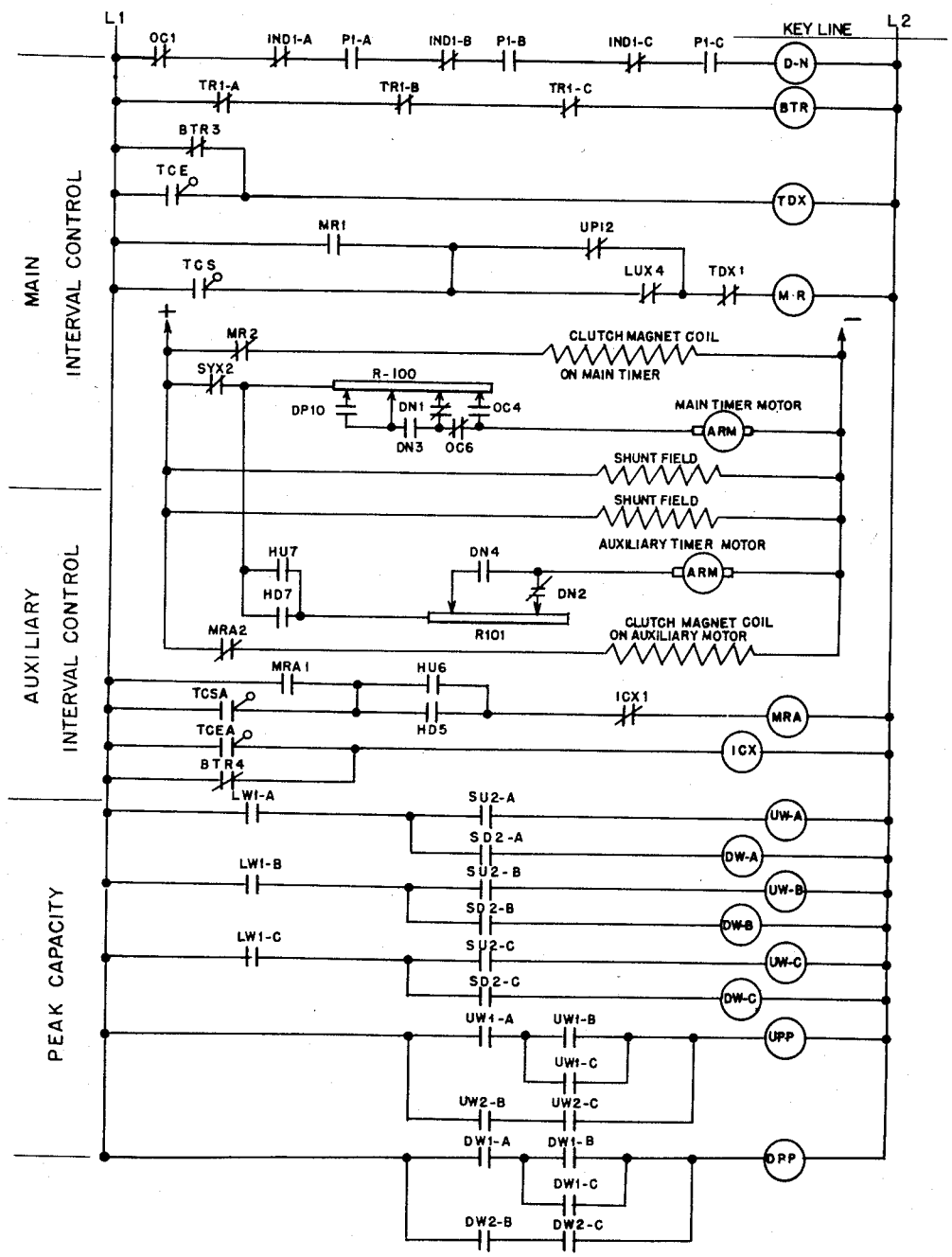
FIG. VII

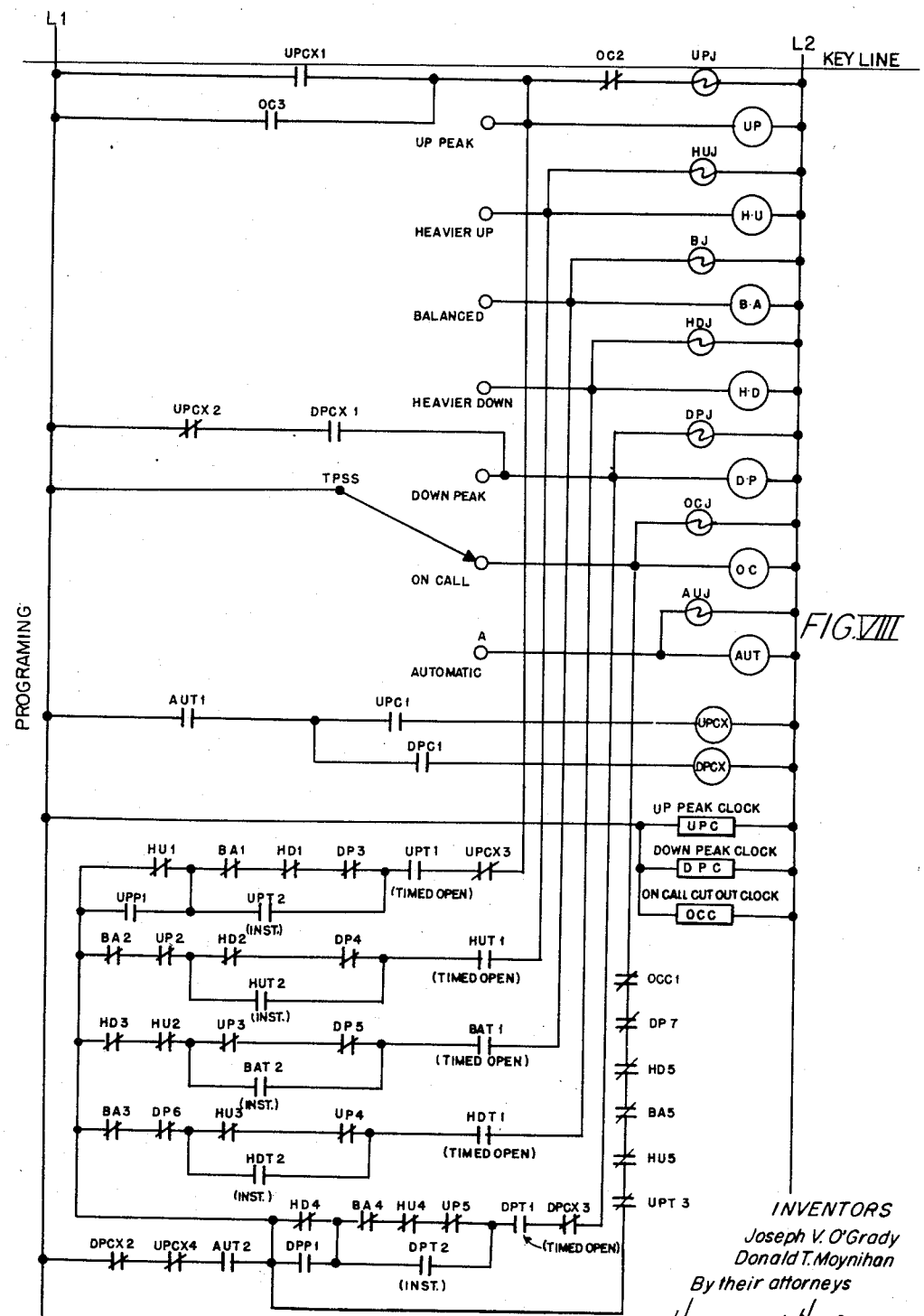
FIG.VIII

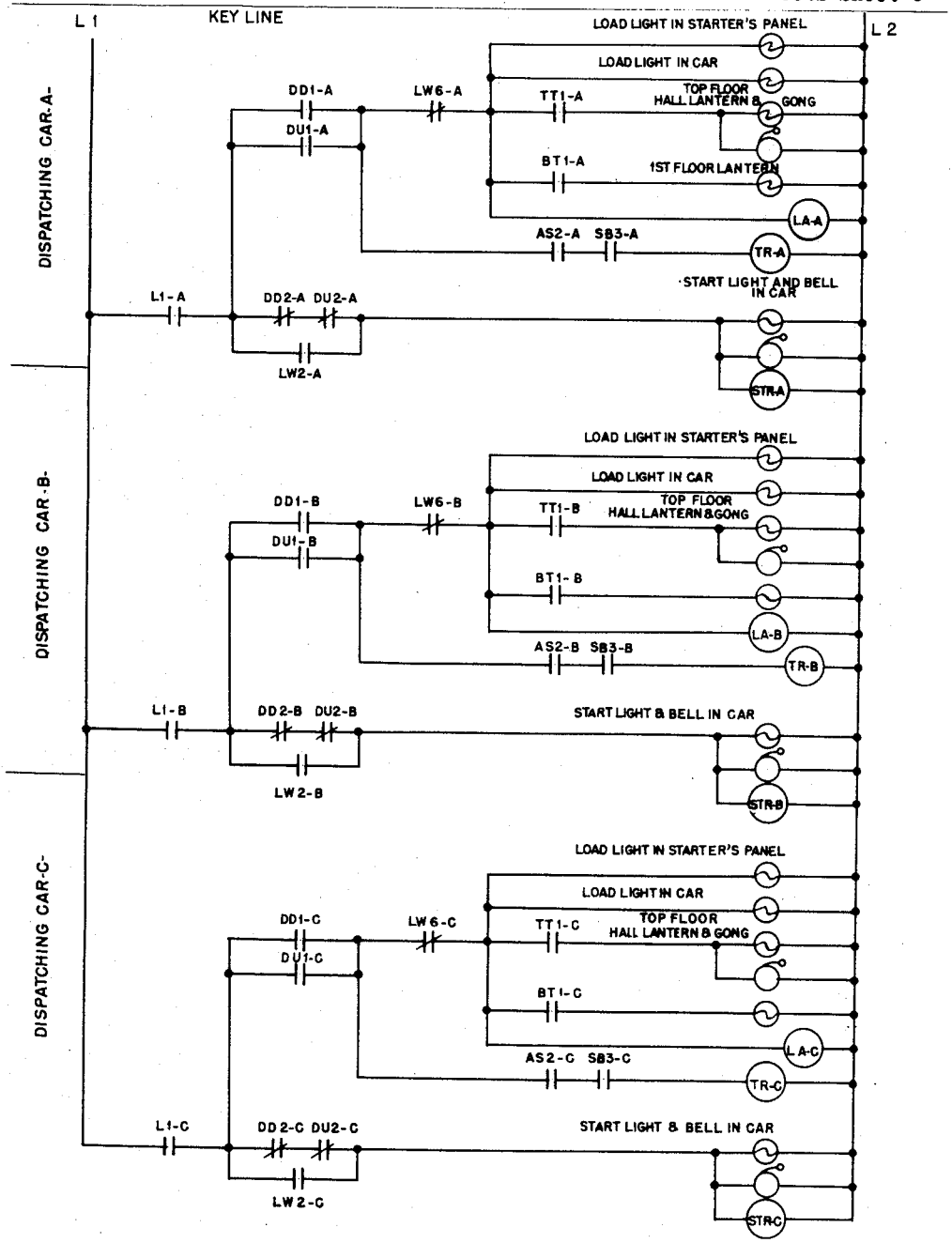
FIG. IX
INVENTORS
Joseph V. O'Grady
Donald T. Moynihan
By their attorneys
Howson and Howson

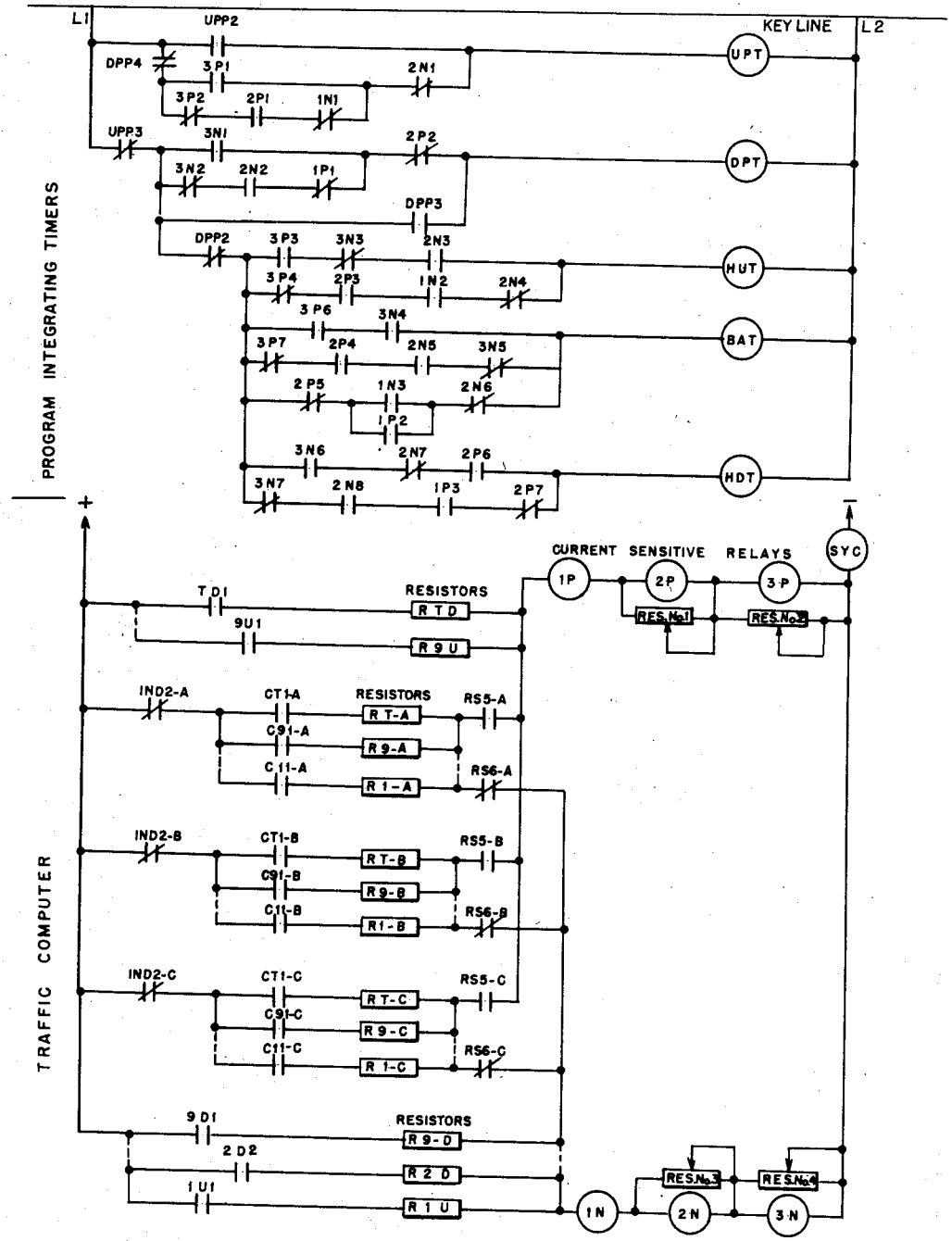
FIG. X

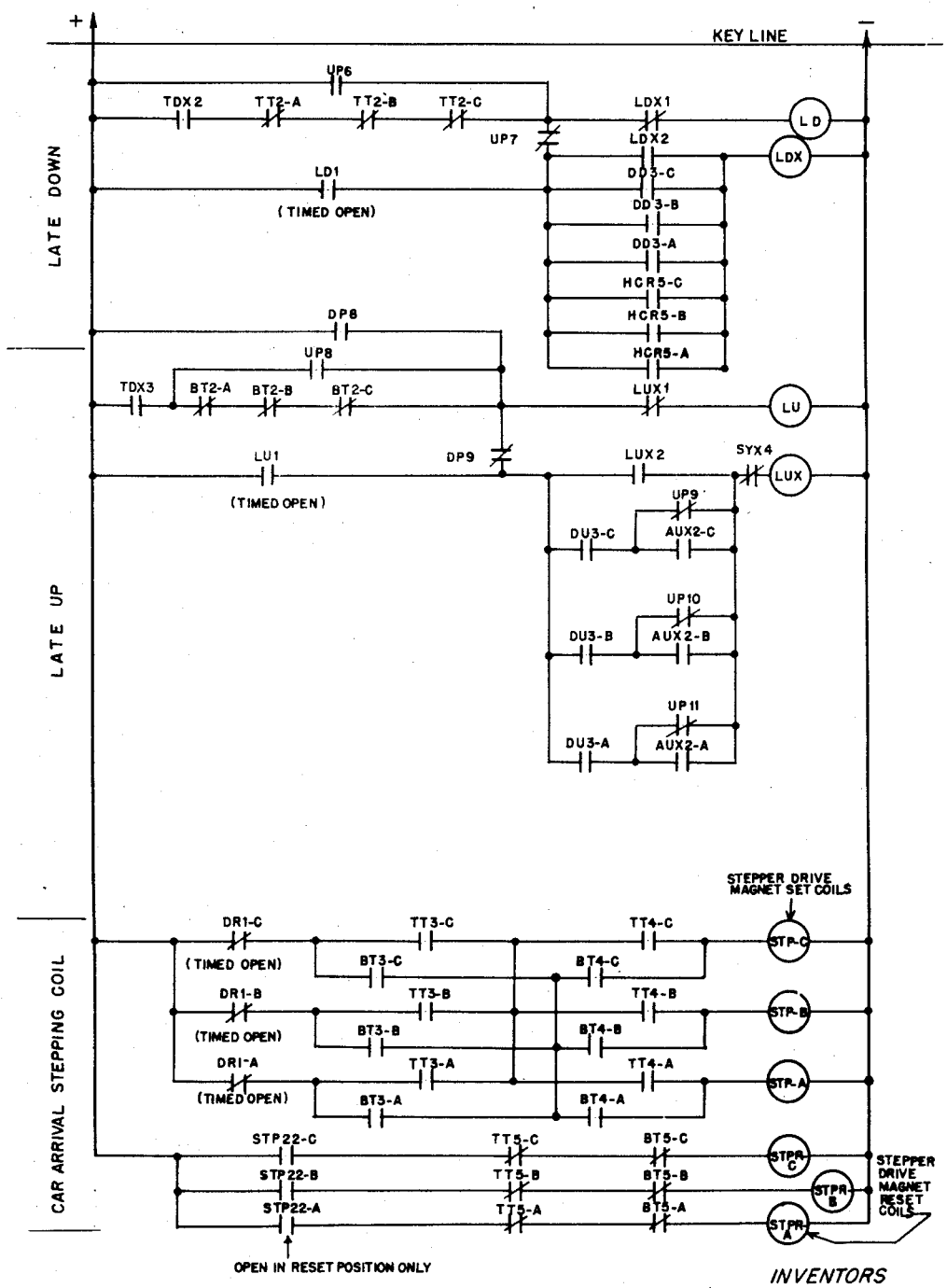
FIG. XI

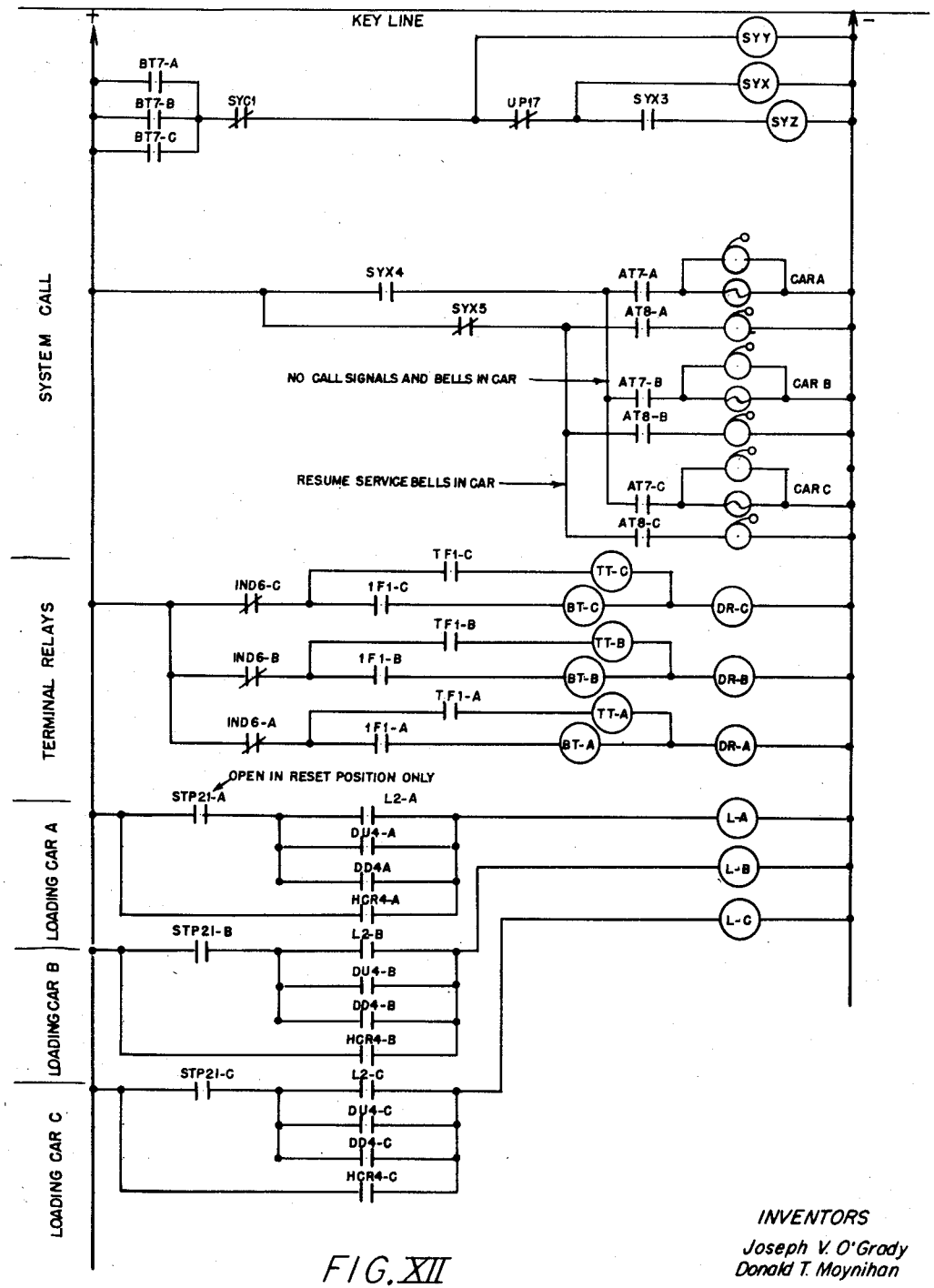
FIG. XII

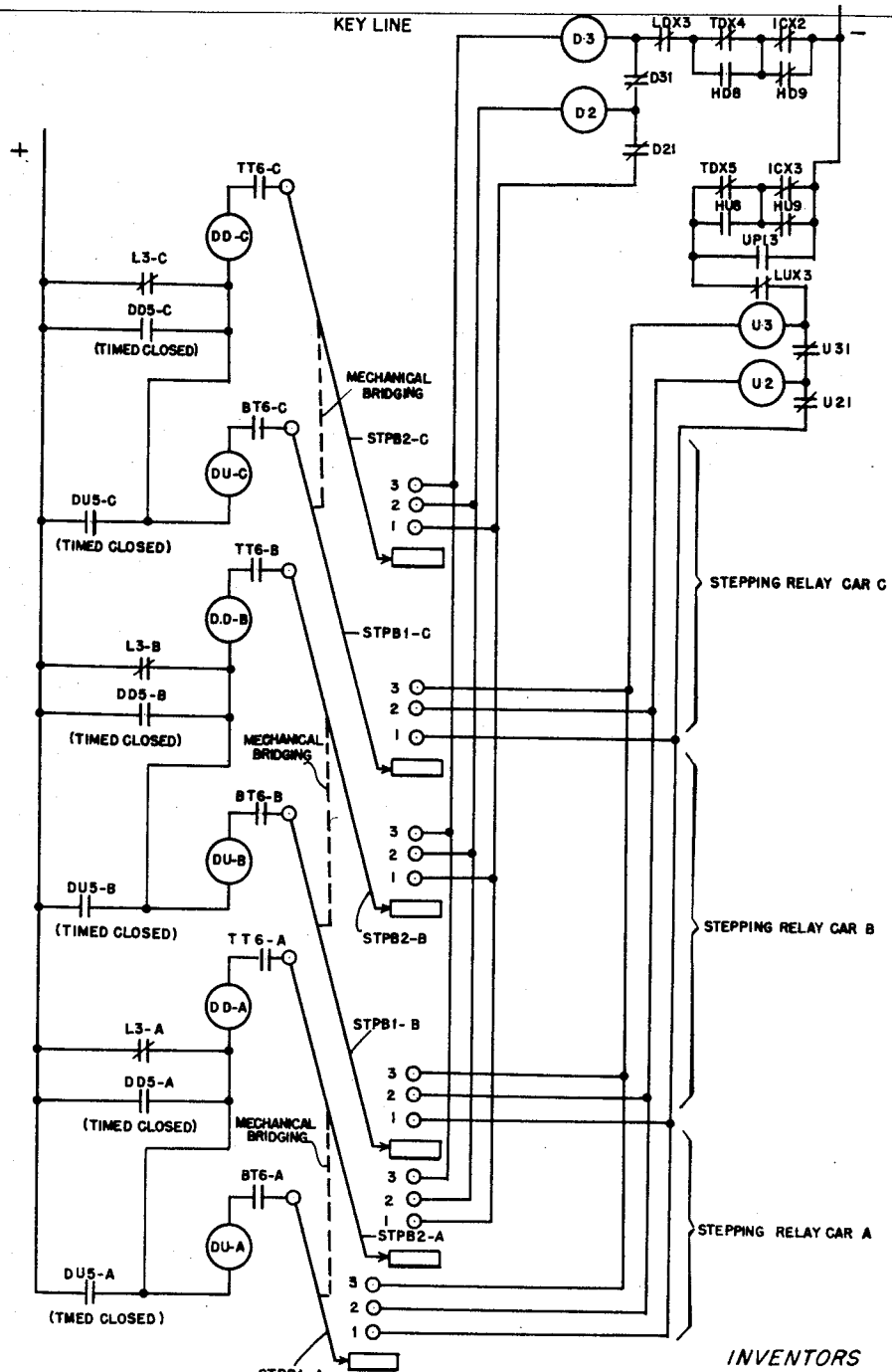
FIG. XIII

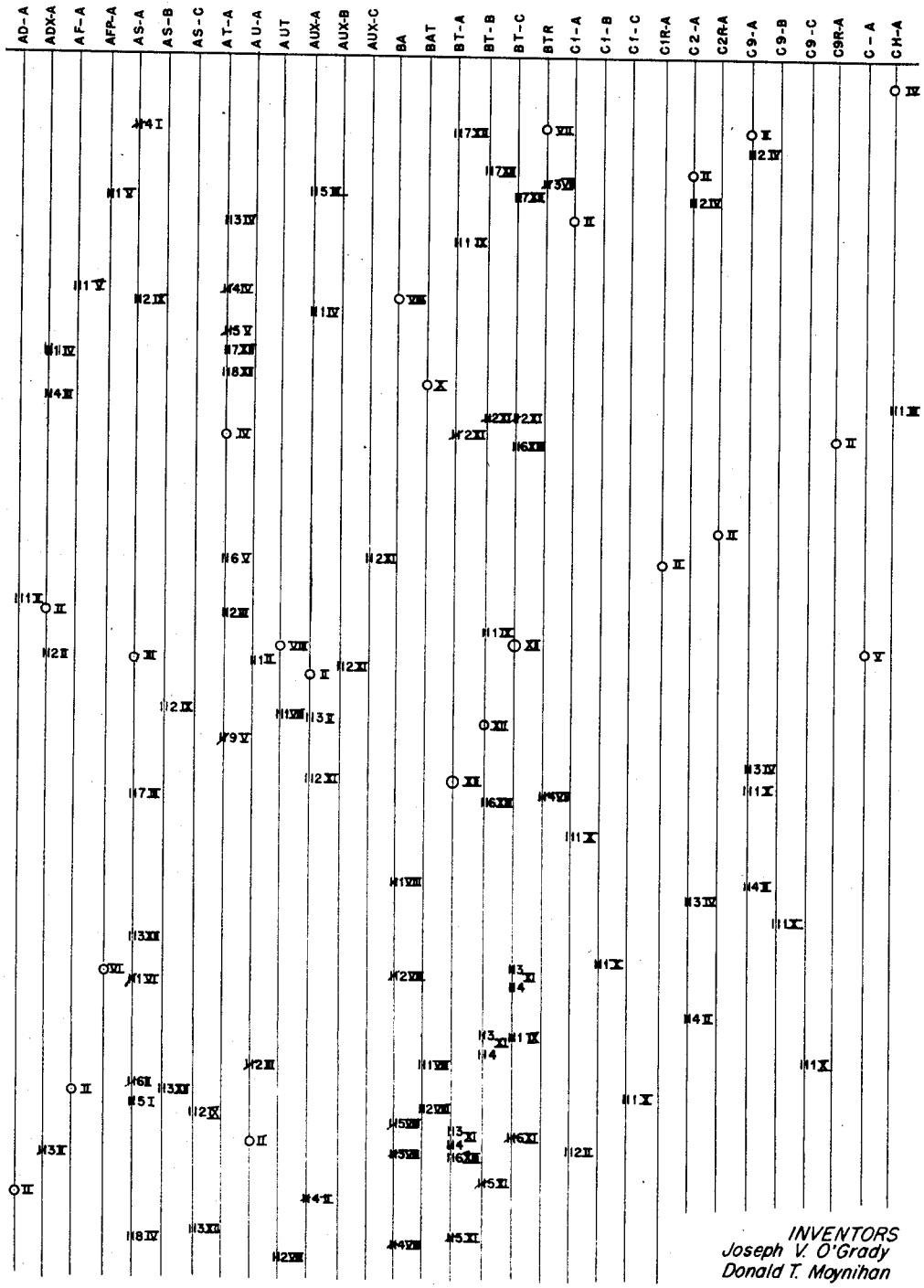
FIG. XVII

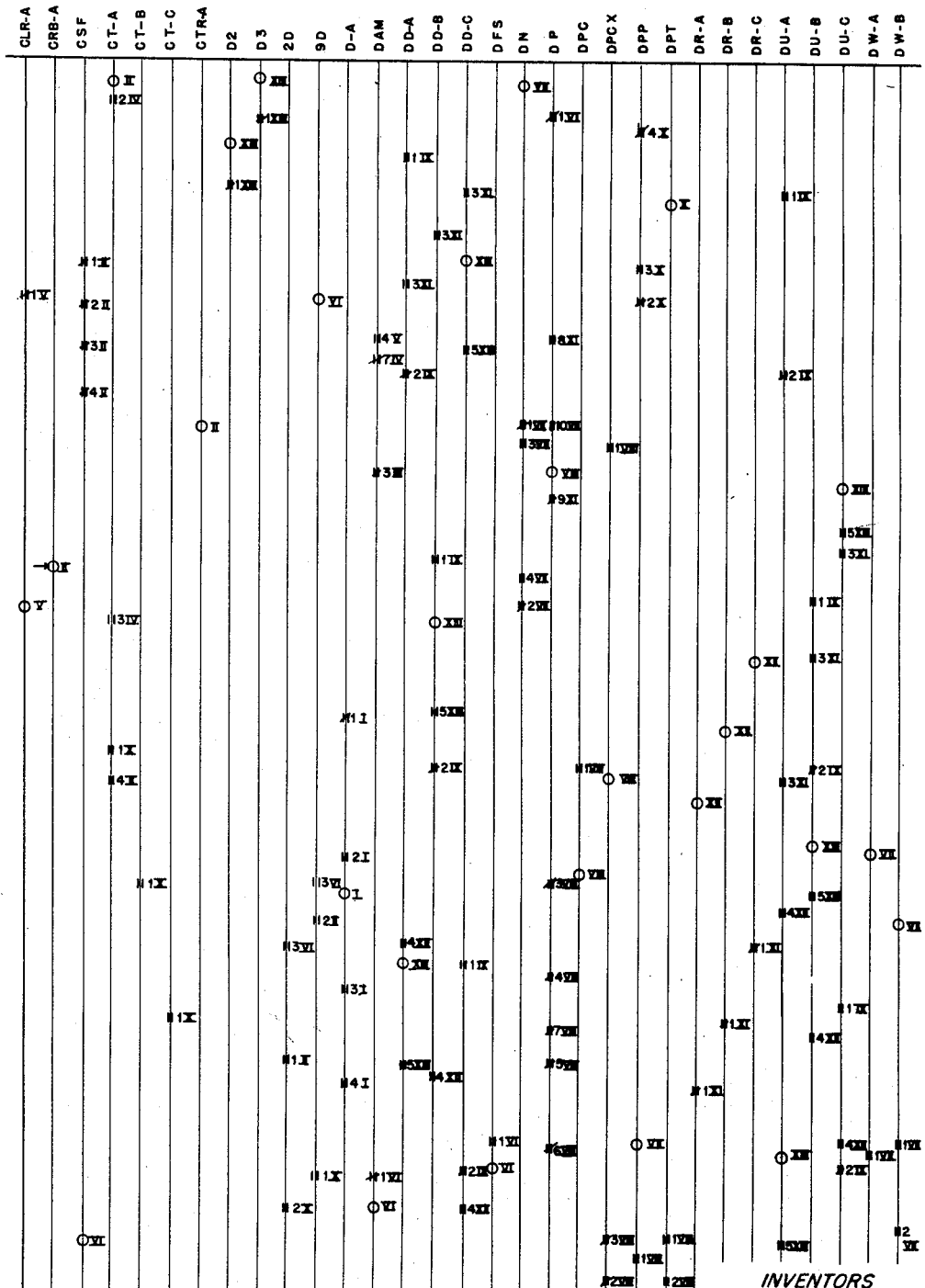
FIG. XVIII

May 31, 1960 J. V. O'GRADY ET AL 2,938,604
ELEVATOR CONTROL SYSTEM
Filed Dec. 24, 1958 19 Sheets-Sheet 16
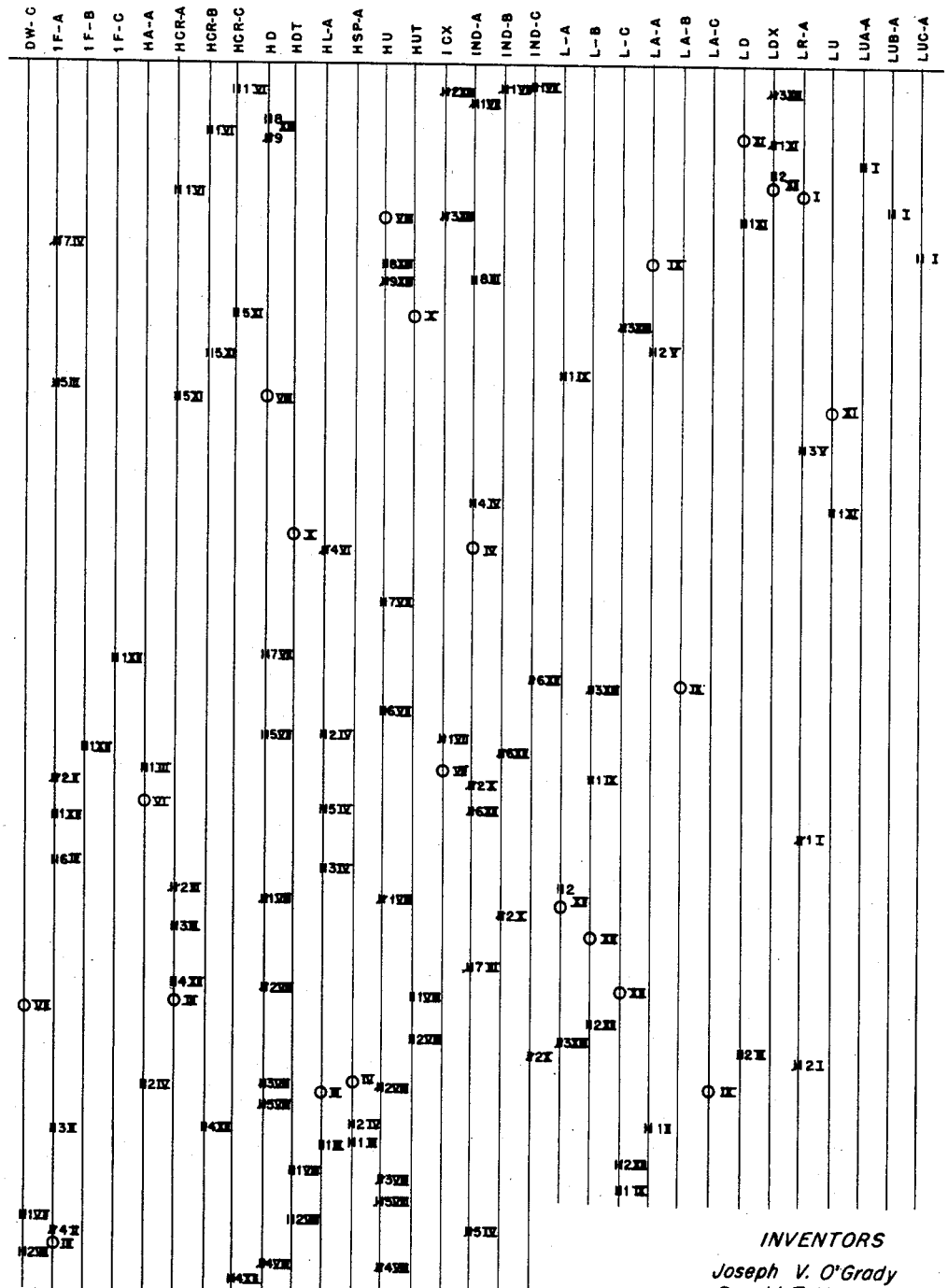
FIG. XIX
INVENTORS
Joseph V. O'Grady
Donald T. Moynihan
By their attorneys
Howson and Howson

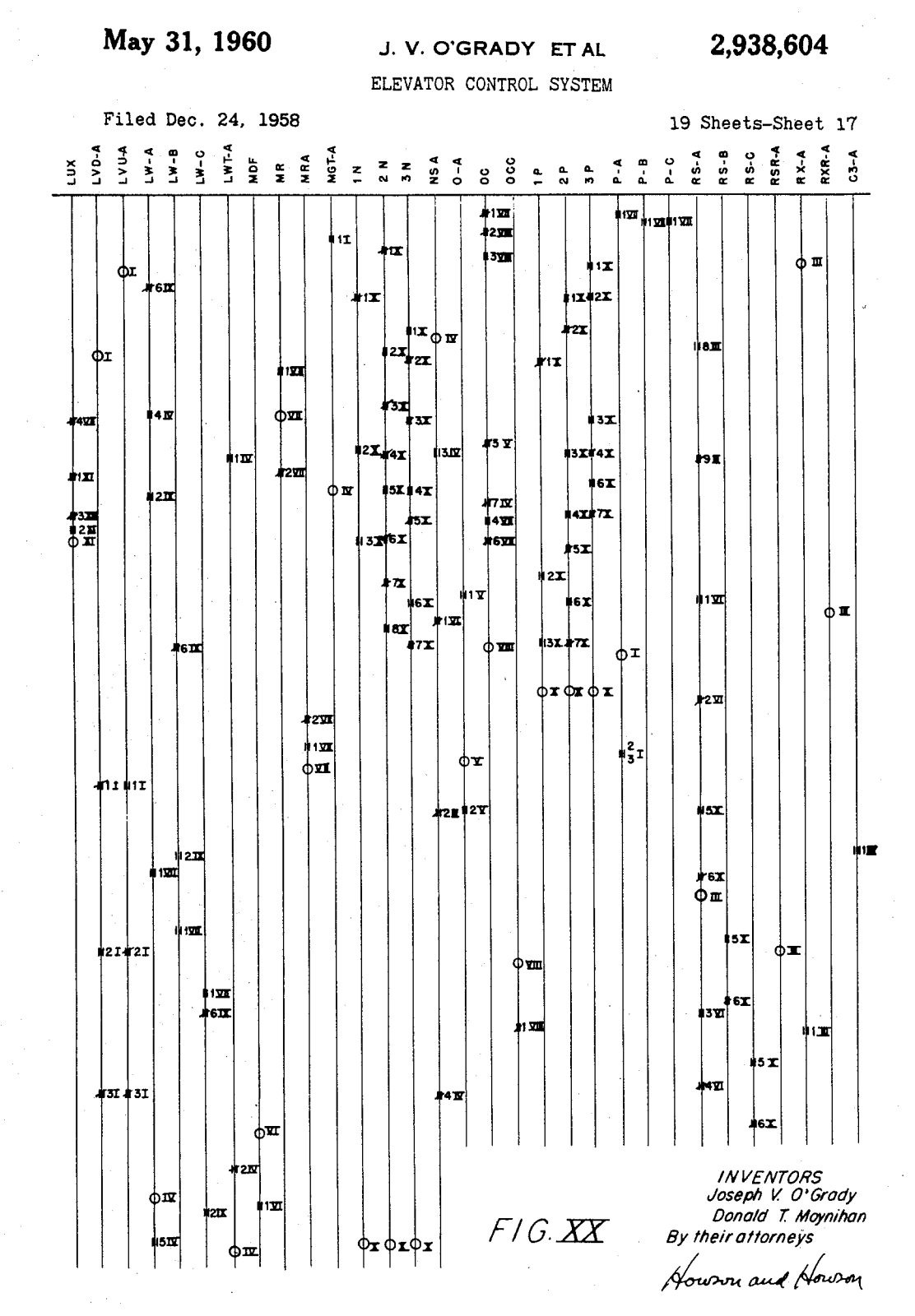

FIG. XX

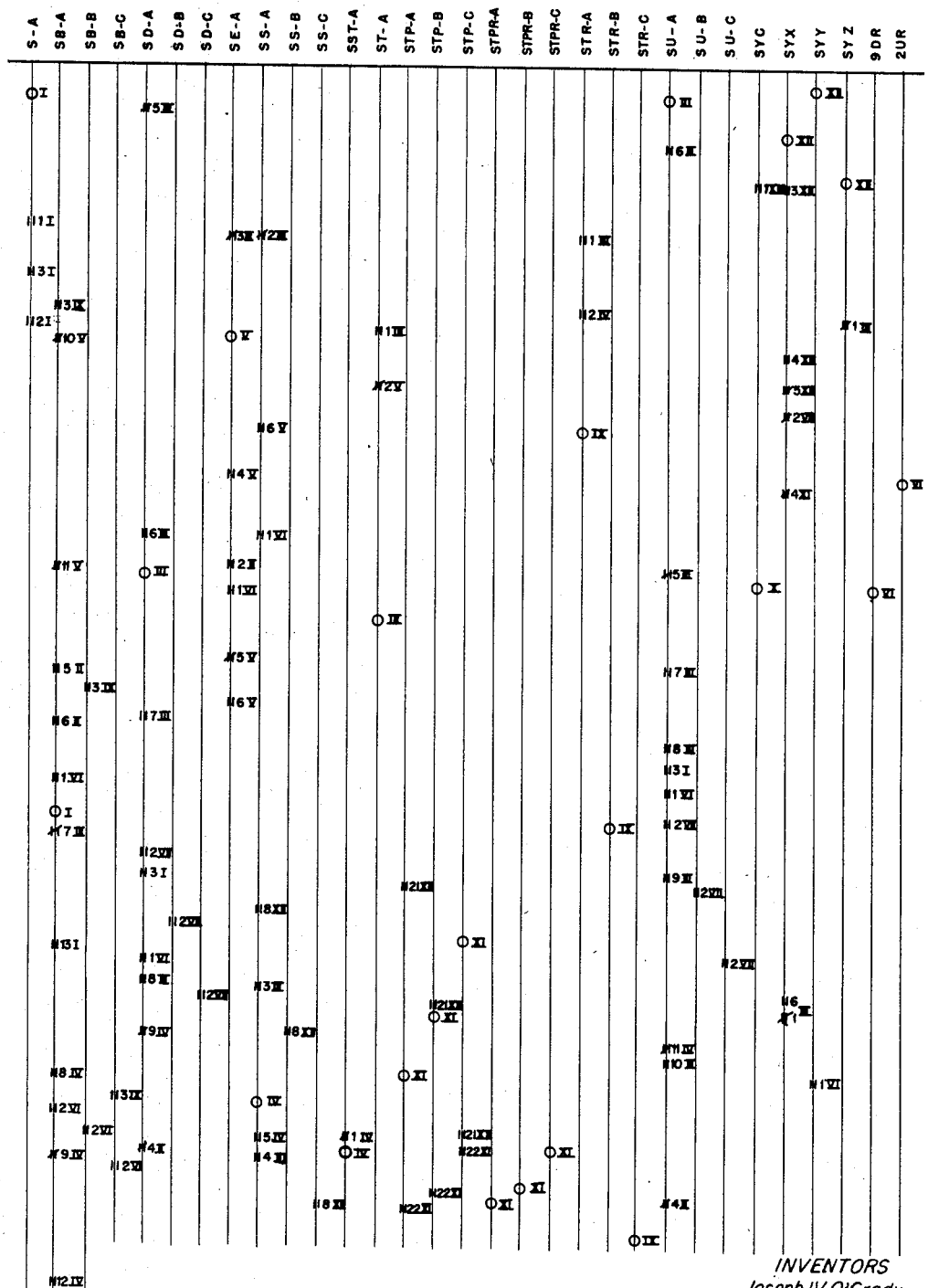
FIG. XXI
INVENTORS
Joseph IV. O'Grady
Donald T. Moynihan
By their attorneys May 31, 1960     J. V. O'GRADY ET AL     2,938,604
ELEVATOR CONTROL SYSTEM
Filed Dec. 24, 1958     19 Sheets-Sheet 19
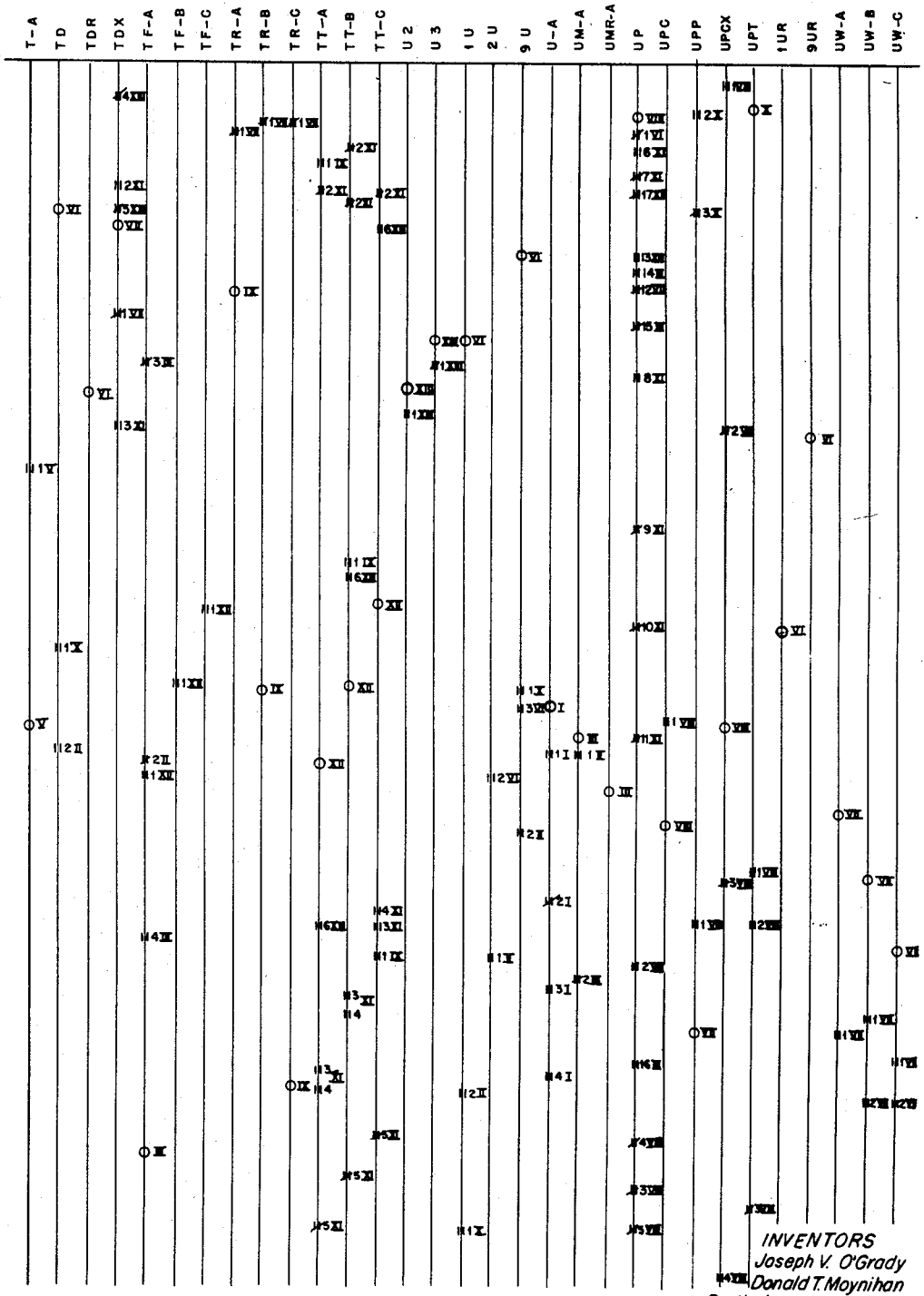
FIG. XXII
INVENTORS
Joseph V. O'Grady
Donald T. Moynihan
By their attorneys United States Patent Office 2,938,604
Patented May 31, 1960

2,938,604

ELEVATOR CONTROL SYSTEM

Joseph V. O'Grady, Middletown Township, Monmouth County, and Donald T. Moynihan, Westfield, N.J., assignors to Elevators Supplies Company, Inc., a corporation of New Jersey Filed Dec. 24, 1958, Ser. No. 782,881

49 Claims. (Cl. 187—29)

The present invention relates to control systems for elevators.

In recent years it has been found economically desirable to employ automatic systems for regulating the travel of elevators in multi-story buildings.

In most of the systems presently in operation having two or more cars, one of the floors, normally the street floor, is selected as the lower terminal floor and an upper floor, normally the top floor in the building, is chosen as the upper terminal floor. Devices are then provided for dispatching the cars from one or both of these terminal floors at timed intervals.

Conventionally hall signals are provided for use by intending passengers on each floor. These signals normally indicate to the elevator system whether a passenger intends to travel upwardly or downwardly from his present position. Car signals are also provided in each elevator car by means of which passengers in the car or the car operator, if one is present, can indicate the floor to which it is desired that the car travel. Hall signals and car signals are conventional in the art, and in the typical case an upwardly moving car will answer only up hall calls and higher car calls and a downwardly moving car only down hall calls and lower car calls.

Modern elevator systems are usually designed for operation either with or without an attendant in each car. Where no attendant is employed, a car arriving at a terminal floor will automatically open its doors to allow its passengers to leave. After a certain time interval it will close its doors and remain standing with the doors closed until it is chosen to be the next car to leave the terminal floor. At this time its doors will open and remain open until it gets the signal to leave. It will then close its doors and move out. As it moves upwardly it will stop for up hall signals and for car calls. At each stop it will open its doors to permit egress and ingress of passengers and then close the doors and move on. Under most conditions it will continue to move until it reaches the most distant terminal when the above cycle will be repeated, but in the reverse direction.

If an attendant is employed with such a system, his function is normally limited to closing the doors and assisting passengers to register car calls.

Conventional modern elevator systems also are usually equipped with a means for changing the program, or mode of operation, of the system. Thus, for example, in a modern office building, the prevailing direction of traffic is quite different at nine in the morning than it is at five in the evening, and a different mode of operation is required for the elevator system in order to furnish optimum service. Most modern systems are provided with a program selector which will enable a supervisor or starter to select which program or service he desires to be put into effect. Conventionally these several programs include the so-called "Up-Peak," "Balanced," "Down Peak" and "On Call" modes of operation. Under Up Peak operation, which is usually employed when the traffic is predominantly upward, cars are dispatched from a lower terminal at timed intervals. They travel only to the highest floor for which a service demand has been registered and then immediately return to the lower terminal.

Under Balanced operation, usually employed where the traffic is about the same in both directions, cars are time-dispatched from both the upper and lower terminals. In certain systems provision is made for reversing an upwardly moving car before it reaches the upper terminal, if it is late.

Down Peak is used where traffic is predominantly downwardly moving. This normally involves time dispatching from the upper terminal and immediate dispatching from the lower terminal, i.e. a car reaching the lower terminal is dispatched therefrom as soon as it has discharged its passengers.

On Call operation is normally used when demand for service is only intermittent, e.g. in an office building, on weekends, evenings and holidays. Under this system cars are normally time dispatched from the lower terminal, provided there is a demand for service. They travel to the highest call, then reverse and park at the lower terminal.

Other programs or modes of operation may also be provided. For example, under conditions of heavy up or heavy down traffic, not to the level of Up or Down Peak, the dispatching interval at the lower or upper terminal may be shortened. Such modified programs are conveniently referred to as "Heavier Up" and "Heavier Down."

As noted above, a switch is usually provided in the lobby of the building by means of which a supervisor or starter can select the program or mode of operation most suitable for the prevailing traffic conditions. In many instances this function is performed by a clock which puts the program desired into effect at certain hours of the day.

The conventional systems whose operation has been described above have a number of drawbacks. In the first place, during most portions of the day, i.e. when the system is on Balanced operation, cars are continually moving between the upper and lower terminals, even though no service demand is registered. This is inherently wasteful of power and, by increasing wear, increases maintenance and servicing costs. Moreover, the shift from one program or mode of operation to another is not responsive to actual traffic conditions, so that optimum service is not provided. Finally, systems of the type described are extremely complex and an occasional malfunction or breakdown often occurs. In prior systems, however, adequate provision has not been made for maintaining elevator service, even if portions of the control system become inoperative.

In accordance with the present invention these drawbacks are overcome. Specifically, the present invention provides a multi-car elevator system serving a plurality of floors in which there are a plurality of modes of operation. A programming switch is provided by means of which a starter or supervisor can manually select any specific program, or put the entire system under automatic control. When the system is under automatic control the mode of operation is subject to selection by (1) a clock; (2) a device sensitive to the load carried by the cars; and (3) a computer of novel design which measures and evaluates the number of hall and car calls in the system.

Another characteristic of the system which tends to make it more economical to operate is that cars may be time dispatched from terminal floors only if there is a service demand in the system; provision being made, however, for dispatching loaded cars prior to the regular dispatching time. Furthermore, under certain modes of operation, when there is no demand for service registered, operation of the entire system is suspended, to be resumed where it left off on registration of a demand for service.

Still another feature of the system is the provision of means whereby if the regular dispatching device breaks down, all the cars will be sent off from the terminal floors; together with means whereby if service signals are not communicated from the various floors to the cars, the cars will be caused to stop at floors regardless of whether or not there is an actual demand for service at those floors.

The invention is generally applicable to elevator systems having at least two cars, serving three or more floors. It is applicable to systems employing an attendant in each car, but is particularly advantageous where no attendants are employed.

In the drawings:

Figs. I-V are schematic "straight line" circuit diagrams of the control circuits for one car in a system according to the invention.

Figs. VI-XIII are schematic "straight line" diagrams of control circuits which are, for the most part, common to all the cars in a system according to the invention.

Fig. XIV is a schematic view in side elevation of a timing device suitable for use in a system according to the invention.

Fig. XV is a schematic view in front elevation of the device of Fig. XIV.

Fig. XVI is a schematic view of an elevator car such as might be used in a system according to the invention, showing the position of load weighing and leveling switches.

Figs. XVII-XXII are key figures to aid in locating the various electromagnetic relays and their contacts in Figs. I to XIII.

To simplify and shorten the present specification, descriptions of various conventional elements of the system have been omitted or will be passed over rather briefly.

The system shown in the drawings comprises three cars A, B, and C operating between a lower terminal floor, the first floor, and a top terminal floor, referred to as the top floor. Floors 2 to 9 lie between the two terminals. The hall call and other circuits for certain intermediate floors have not been shown in the drawings, but their omission is indicated by dotted lines where appropriate. Moreover, only the individual circuits for Car A have been shown in Figs. I-V. The circuits for Cars B and C are identical and have not been shown.

An up and a down hall button are provided for each of floor 2 to 9. An up hall button is provided for the first floor and a down hall button for the top floor. The construction of these buttons may take any desired form. Normally a visual signal is provided to let the intending passenger know his call has been registered. This is not shown in the drawings for the sake of simplicity.

In each car, car call buttons are provided, one for each floor. Again the particular design of these buttons is not a part of the present invention has not been shown in detail.

The elevator cars are preferably driven by a direct current hoisting motor. Current is supplied to the motor at a variable voltage from a D.C. generator. The D.C. generator in turn is driven by an A.C. motor which also serves to drive an exciter. The exciter furnisher direct current to the separately excited field windings of the D.C. generator and the hoisting motor and, also, to various electromagnetic switches used in the control system, where direct current is required. This arrangement is conventional in the art and is shown schematically in Fig. I.

The hoisting motors drive the cars by conventional techniques as shown schematically in Fig. XVI. In that figure, the hoisting motor 10 is shown as driving a shaft 11 upon which are mounted a brake 12 and a sheave 13. A hoisting cable 14 is wound around the sheave 13. To one end of the cable 14 is secured a counterweight 15; the elevator 16 is attached to the other end.

Many of the control functions of the system depend on an exact knowledge of the position of the elevator cars in the shaft. To secure this information a floor selector 17 is provided. As will be readily understood by those skilled in the art, the floor selector comprises a carriage 18 driven in a vertical direction over a switchboard 19. The carriage is driven by the elevator car 16 through a linked steel tape 9, sprocket 8, shaft 7 and gear assembly 20. The carriage moves over the switchboard 19 in a manner which duplicates the movement of the elevator car in the hoistway, opening and closing circuits, through switches and contacts on the switchboard in accordance with the movement of the car. The operation and function of floor selectors are well known in the art and no more elaborate description is necessary at the present time. The construction and operation of a typical floor selector are described, for example, in Patent No. 2,074,575 and in many other prior patents.

In the system to be described further below, various electromagnetic switches are employed. These are designated as follows:

| Symbol | Function |
|---|---|
| AD | Down Selection Relay. |
| ADX | Down Pilot Relay. |
| AF | Call at Floor (1st Level). |
| AFP | Hall Call at Floor Relay. |
| AS | Auxiliary for SU & SD Relays. |
| AT | Attendant Relay. |
| AU | Up Selection Relay. |
| AUT | Automatic Program Relay. |
| AUX | Up Pilot Relay. |
| BA | Balanced Program Relay. |
| BAT | Balanced Program Relay (Timed Drop-out). |
| BT | Bottom Terminal Availability Relay. |
| BTR | Timer Recycle Auxiliary Relay. |
| C | Close Door Contactor. |
| C1 to C9, CT | Car Call Memory Relay (Latch). |
| CLR | Auxiliary Door Close Relay. |
| CH | Car Call above 1st Floor Relay. |
| C1R to C9R, CTR | Reset Coil for Car Call Relay. |
| CSF | Common System Failure Relay. |
| D | Down Contactor. |
| D2, D3 | Down Arrival Sequence Relays. |
| 2D to 9D, TD | Down Hall Call Memory (Latch) Relay. |
| DAM | Dispatching Auxiliary Means Relay. |
| DD | Dispatch Down Relay. |
| DFS | Dispatcher Failure Signal Relay. |
| DN | Any Car Out of Service Relay. |
| DP | Down Peak Program Relay. |
| DPC | Down Peak Clock. |
| DPCX | Down Peak Clock Relay. |
| DPP | Down Peak Capacity Relay. |
| DPT | Down Peak Program Relay (Timed Drop-out). |
| DR | Stepper Cutout Relay. |
| 9DR, TDR | Reset Coil for Down Hall Call Relay. |
| DU | Dispatch Up Relay. |
| DW | Down Weighing Relay. |
| 1F | Car at 1st Floor Relay. |
| HA | Hall Call Pickup Relay. |
| HCR | Highest Call Reversal Relay. |
| HD | Heavier Down Program Relay. |
| HDT | Heavier Down Program Relay (Timed Drop-out). |
| HL | Highest Call Relay. |
| HSP | High Speed Pickup Relay. |
| HU | Heavier Up Program Relay. |
| HUT | Heavier Up Program Relay (Timed Drop-out). |
| ICX | Short Interval Timer. |
| IND | Independent Service Relay. |
| L | Loading Relay. |
| LA | Next Car Relay. |
| LD | Late Down Car Dispatch Relay. |
| LDX | Late Down Car Reset Relay. |
| LR | Level Relay. |
| LU | Late Up Car Dispatch Relay. |
| LUX | Late Up Car Reset Relay. |
| LVD | Leveling Down Relay. |
| LVU | Leveling Up Relay. |
| LW | Load Weighing Relay. |
| LWT | Load Weighing Time Relay. |
| MDF | Main Dispatcher Failure Relay. |
| MGT | Motor Generator Cutout Relay. |
| MR | Interval Time Clutch Magnet. |
| MRA | Short Interval Timer Clutch Magnet. |

| Symbol | Function |
| --- | --- |
| 1N | 1 Negative Computer Relay. |
| 2N | 2 Negative Computer Relay. |
| 3N | 3 Negative Computer Relay. |
| NS | Non-Stop Relay. |
| O | Open Door Contactor. |
| OC | On Call Program Relay. |
| OCO | On Call Cut-Out Clock Relay. |
| P | Potential Relay. |
| 1P | 1 Positive Computor Relay. |
| 2P | 2 Positive Computor Relay. |
| 3P | 3 Positive Computor Relay. |
| RS | Reversing Memory (Latch) Relay, Latched for up, reset for down. |
| RSR | Reset Coil for RS. |
| RX | Direction of Motion Memory Relay Latched for Up, Reset for Down. |
| RXR | Reset Coil for RX. |
| S | Starter for AC Driving Motor for Motor Generator Set. |
| SB | Brake Contactor. |
| SD | Start Down Relay. |
| SE | Door Pilot Relay. |
| SS | Stop Signal Relay. |
| SST | Stop Signal Reset Time Relay. |
| ST | Attendant Starting Relay. |
| STP | Stepper Drive Magnet. |
| STPR | Stepper Reset Magnet. |
| STR | Automatic Starting Relay. |
| SU | Start Up Relay. |
| SYC | System Call Relay. |
| SYX | System Call Auxiliary Relay. |
| SYY | System Call Indicating Relay. |
| SYZ | System Call Time Relay. |
| T | Door Open Time Relay. |
| TDX | Interval Timer. |
| TF | Car at Top Floor Relay. |
| TR | Timer Recycle Relay. |
| TT | Top Terminal Availability Relay. |
| U | Up Contactor. |
| 1U to 9U | Up Hall Call Memory (Latch) Relay. |
| U2 | Second Up Arrival Sequence Relay. |
| U3 | Third Up Arrival Sequence Relay. |
| UM | Up Signal Memory (Latch) Relay. |
| UMR | Reset Coil for UM. |
| UP | Up Peak Program Relay. |
| UPC | UP Peak Clock. |
| UPCX | UP Peak Clock Relay. |
| UPP | Up Peak Capacity Relay. |
| UPT | Up Peak Program Relay (Timed Drop-out). |
| UW | Up Weighing Relay. |
| 1UR to 9UR | Reset Coil for Up Hall Call Relay. |

In the drawings the letters listed above have been placed on the coils of the relays. The contacts of each relay bear the letters of the coil followed by a numeral. Thus, the third contact of the Heavier Down Program Relay is designated HD3.

As to certain of the relays, one is provided for each car. This is indicated by a dash followed by the car designation. Thus, for example, the down contractor switch coil for Car A is designated D-A. The third contact of this relay is D3-A.

The various switches and their contacts may be located by using Figs. XVII to XXII. In Figs. XVII–XXII, one vertical line is devoted to each relay. The coil and the contacts are arranged along the line at the approximate horizontal level at which they will be found in Figs. I–XIII. The figure number appears near the contact number or coil symbol on Figs. XVII to XXII. Thus to find the location of contacts TF3-A, we go to Fig. XXII, where all the contacts for relay TF-A are listed. Fig. XXII shows that TF3-A appears on Fig. III. By matching the horizontal line at the top of Fig. XXII with the key line at the top of Fig. III, and moving to horizontal level of Fig. III corresponding to the location of the symbol TF3-A on Fig. XXII, contacts TF3-A are easily found.

To further facilitate understanding of the invention the function of each group of relays is noted on the left hand side of Figs. I–XIII.

As shown in the drawings, the system is set for On Call operation by means of the Traffic Program Selector Switch, TPSS (Fig. VIII). This switch is located on the starter's panel and is manually positioned to the specific program desired, or else is set for automatic operation.

When the program switch is set on On Call, the OC relay is energized. Contacts OC3 are thus closed, and the Up Peak relay is also energized.

In the drawings, Car A is shown at the first floor and it will be further assumed that the system is arranged to operate without an attendant.

When Car A reached the first floor at the end of a previous trip, a brush FSB3-A (Fig. III) on the carriage 18 of the floor selector 17 engaged a contact on the switchboard 19 of the floor selector, establishing a circuit for the first floor relay 1F-A. Moreover, assuming there were no other cars at the first floor when Car A arrived, Car A was chosen to be the first car to leave. The sequence by means of which this selection was made will be explained in detail below.

Assume, for purposes of the present description, that Car A has been selected as the next to leave and is standing at the first floor with its doors closed. Assume now an intending passenger pushes the first floor up button (Fig. VI). Pushing the button energizes 1U, the circuit being established from L1 through the hall button through the coil of 1U to L2. Energization of 1U closes contact 1U2 setting up a circuit for relay AF-A. This circuit runs from L1-A through 1U2, through LA1-A, through 1F3-A, AS6-A through the coil of AF-A to L2A. LA1-A were closed when Car A was selected to be the next car to be dispatched, a procedure which will be described more fully below. 1F3-A are closed when Car A is at the first floor. AS6-A is normally closed with the car at rest.

Energization of AF-A closes contacts AF1-A in the door control circuit. Closing of AF1-A energizes relay SE-A. The circuit for this runs from L1-A through AT5-A (closed since the car is not on attendant operation) AF1-A, CLR1-A (closed when the doors are closed) SB10-A through the coil of SE-A to L2-A. Contacts SB10-A are closed because relay SB is only energized when the brake has been lifted, i.e. when the car is stopped relay SB is not energized.

Energization of relay SE-A closes SE6-A energizing relay O-A. Relay O-A controls the door motor (not shown) and its energization causes the doors to open. The mechanism by means of which this is accomplished is conventional and is not specifically shown.

Assume the intending passenger enters the car and presses the car button for the ninth floor. After a time, the doors will close. To understand why the doors close, it must be noted that when SE-A was energized it closed contacts SE1-A. SE1-A on closing energized the reset coil 1UR for the first floor up relay, the circuit being NS1-A, SE1-A, RS1-A (closed with the car at the first floor) and 1UR. Energization of 1UR reset the first floor hall call relay 1U. This opened 1U2-A, causing AF-A to drop out. AF-A dropping out opened the circuit for SE-A through AF1-A. However, when relay O was actuated, it established a second circuit for SE-A through O1-A, SE4-A and ST2-A. It also established a circuit for relay T-A by closing O2-A. Relay T, by closing contacts T1-A, established a second holding circuit for relay SE-A.

As the doors became fully opened, the open limit switch OL was mechanically opened. (See Fig. XVI.) This caused relay O-A to drop out, opening O1-A and O2-A. In opening relay O1-A severed one holding circuit for SE-A. When contacts O2-A opened, relay T dropped out. Timed contacts T1-A, therefore, also dropped out after a suitable delay, causing SE to drop out. SE dropping out caused SE5-A to close, energizing relay C-A. Relay C-A caused the door motor to close the doors.

With the car button for the ninth floor pressed, relay C9-A was energized, closing contacts C92-A, C93-A and C94-A. Contacts C94-A established a circuit for relay AU-A. This circuit runs from L1 through C94-A, through the ninth floor selector switch SLS9-A [1] which

---

[1] A switch which is opened by the carriage 18 of the floor selector 17 shortly before the elevator car reaches the ninth floor.

is closed with the car on the first floor, through SD4–A, which is closed with relay SD–A not energized, and ADX3–A, also normally closed with the car at the first floor, through the coil of AU–A to L2.

Energization of AU–A establishes a circuit for AUX–A through AU1–A. Energization of AUX–A closes AUX1–A, establishing a circuit for MGT–A. This circuit is via STR2–A which is closed when a service demand has been registered.

Relay MGT–A controls the energization of the A.C. motor which drives the exciter armature and the D.C. generator. In any other mode of operation except On Call, MGT–A is continuously energized via normally closed OC7 contacts. In On Call operation, these contacts are opened and, unless there is a service demand MGT–A drops out. After a suitable time delay following dropping out of MGT–A, contacts MGT1–A open, dropping out relay S–A and thus opening contacts S1–A S2–A and S3–A in the A.C. motor circuit.

Referring to the assumed situation, since MGT–A is energized, contacts MGT1–A close and relay S–A is energized. Energization of S–A closes S1–A, S2–A, and S3–A energizing the A.C. motor. Assuming none of the safety devices has been operated, the relay P–A is energized. The circuit for this goes from L1–A through the emergency stop switch (normally closed), various safety devices, through the coil of P–A to L2. The specific safety devices have not been shown. They may include a broken tape switch, governor switch, pit switch, motor overload switch, and the like, as is conventional in the art.

Relay P–A closes its contacts P2–A and P3–A, permitting energization of the hoisting motor.

As part of the car door closing operation described above, relay SE–A dropped out, closing contacts SE3–A. This established a circuit for relay SU–A which runs from L1–A through SS2–A (closed except during car stopping operation), SE3–A, STR1–A, UP14 (normally closed when the car is on On Call program), AUX5–A (closed when AUX–A is energized), SD5–A (normally closed at first floor), through the floor selector switch [2] SLQT–A for the top floor through the coil of SU–A to line L2–A.

Contacts STR1–A are closed when Car A is selected to be the next car to be dispatched, the dispatching interval has expired and a demand for service has been registered. The mechanism by means of which this is accomplished will be described more fully below; however, for present purposes, these conditions are assumed to obtain and STR1–A is closed.

It will be noted that SU–A may also be energized through the circuit SS2–A, SE3–A, CH1–A, TF3–A, UP14, AUX5–A, SD5–A, and SLQT–A. TF3–A is closed since the car is not at the top floor. CH1–A is closed by car call contacts C92–A completing a circuit for CH–A. However, this circuit is basically an emergency circuit provided for the unusual situation where an intending passenger boards a car which has not been selected as the next to leave. Rather than have the passenger wait until his car is selected, the provision of CH1–A (and other similar contacts in Cars B and C) enables the passenger to start his car before the signal from the dispatching mechanism closes the STR1 contacts.

Energization of relay SU–A closes SU3–A, establishing a circuit for relays U–A and SB–A. This circuit runs from the positive line through the door interlocks (closed since the door is closed) through SU3–A, D1–A (closed since D–A is not energized) the coil of relay U–A, through coil of relay SB–A to the negative line.

Relay SB–A, on energization, closes contacts SB13–A and thus energizes the brake magnet, lifting the brake.

Energizaion of relay U–A closes contacts U1–A, establishing a holding circuit for U–A and SB–A. Contacts U3–A and U4–A are also closed, closing the circuit for the generator shunt field. This circuit is through contacts AS5–A (closed when SU–A was energized), a small portion of the generator field resistance, contacts U3–A, the generator field, and contacts U4–A. The brake having been released and the generator energized, Car A starts up.

As Car A moves up in its hoistway, the carriage of the floor selector moves in analogous manner over the switchboard. As it nears the ninth floor, the slowdown brush SLU–A on the floor selector energizes the up slowdown contact for the ninth floor (see Fig. IV). This establishes a circuit for HSP–A through C93–A, brush SLU–A, contacts SD9–A, SB8–A, and the coil of HSP–A.

HSP–A, being energized, closes HSP2–A, completing a circuit for SS–A. SS–A, being energized, opens SS2–A and closes SS5–A. SS2–A drops out SU–A. SS5–A establishes a holding circuit for SS–A through SST1–A.

Dropping out of SU–A opens SU7–A, causing AS–A to drop out. This opens AS5–A in the circuit for the generator shunt field, inserting more resistance in that field and slowing the car down. As the car comes within leveling range of the ninth floor, leveling switch LUA–A is closed. This is done by means of a cam 21 located in the hatchway below the floor (Fig. XVI). As switch LUA–A is closed, it energizes relay LVU–A. Contacts LVU3–A thus open, inserting more resistance in the generator shunt field circuit and thus slowing the car down still further. As the car comes level with the floor, leveling switch LUB–A is closed by cam 21, energizing relay LR–A and opening LR2–A, thus inserting the full value of the resistance in the generator field circuit. Contacts LR1–A in the holding circuit for relays U–A and SB–A also open. U–A and SB–A do not immediately drop out, however since LVU1–A remain closed as long as the cam 21 bears on switch LUA–A. When the car is level with the floor LUA–A opens and LVU–A drops out, opening LVU1–A and causing U–A and SB–A to drop out. Dropping out of SB–A opens SB13–A, causing the brake to be applied and the car to be brought to a stop.

As the car approached the final slowdown zone, i.e. as relay LR–A was energized, the door opening circuits were prepared by energization of SE–A. This was through SS6–A, LR3–A, ST2–A, and the coil of SE–A. SE–A closed SE6–A, setting up a circuit for O–A. As noted above, energization of O–A, causes the doors to open.

As the brake relay SB–A dropped out, contacts SB9–A closed, completing a circuit for SST–A. After a suitable time delay, SST1–A opened, breaking the circuit for SS–A.

When the car reached the ninth floor, the car call reset brush CBR–A (Fig. II) on the floor selector engaged a ninth floor contact on the selector. Thus, a circuit was set up for the car call reset relay C9R–A (relay SE–A being energized and SE2–A closed). This reset relay C9–A.

Assume now the car has stopped, its doors have opened, and the passenger has got out. Assume further that no passenger gets in. After a suitable time, the doors will close. This is accomplished by the following sequence: Relay SS–A, in dropping out, opens SS6–A, opening a circuit for SE–A. SE–A is temporarily maintained through O1–A. When the doors reached their full open position, however, the limit switch OL opens dropping out O–A. O–A in dropping out opens O1–A and O2–A. O2–A drops out T–A. After a suitable time interval T1–A opens, dropping out SE–A. SE–A, in dropping out closes SE5–A, starting the door closing operation described above.

There being no further call in the system the car will now reverse and travel to the lower terminal floor. The sequence by means of which this is accomplished is as follows:

When SS–A drops out through the dropping out of SST–A, described above, a circuit is established for SD–A through SS2–A, SE3–A, SYZ1 (closed on On Call ---
[2] A switch opened by the carriage 18 of the floor selector 17 about 6 inches before the car reaches the top floor.

operation), 1F5-A (closed with the car above the first floor) TF3-A (closed with the car below the top floor), UP14 (closed on On Call operation), ADX4-A, the first level selector switch SLQ1-A, and the coil of SD-A. Relay ADX-A was energized by the energization of relay AD-A. Relay AD-A was energized by the dropping of AUX-A, which occurred with the dropping out of AU-A. The selector switch SLQ1-A was closed when the car moved up from the first floor.

The energization of relay SD-A closes contacts SD3-A establishing a circuit for relays D-A and SB-A. Relay D-A energizes the generator shunt field in the opposite direction and with the release of the brake the car is caused to reverse and start down.

The foregoing description has shown how the car is started, and stopped in answer to a car call and how when on On Call operation, it will then reverse and return to the first floor provided there was no higher call in the system. If in place of a car call, an up hall call for the second floor had been registered, a somewhat different sequence would have occurred.

When the second floor up button is pushed, 2U is energized, closing 2U1. This establishes a circuit for AU-A, through 2U2, SLS2-A, SD4-A, ADX3-A and AU-A. SD4-A is closed with the dropping out of SD-A as the car was brought to a stop at the first floor. ADX3-A closed when AD-A dropped out as the car arrived at the first floor.

AU-A closes AU1-A, establishing a circuit for AUX-A. AUX-A closes AUX5-A. Assuming the car has been selected as next to leave and the dispatching interval has expired STR1-A is closed and SU-A is energized.

With SU-A energized the starting operation is as described above.

When the car approaches the second floor, floor selector brush FSB4-A (Fig. VI) engages a second floor contact and energizes relay HA-A. This circuit is through contacts 2U2, brush FSB4-A, contacts SU1-A, SB1-A and the coil of HA-A.

Relay HA-A on being energized closes HA1-A completing a circuit for UM-A. UM-A is a latching type relay. It closes contacts UM1-A in the circuit for relay AUX-A. AUX-A is thereby retained in energized condition even though there is no higher call in the system. Because AUX-A is kept energized AUX5-A is kept closed and the car is kept headed in the up direction.

Relay HA-A also engages contacts HA2-A, completing a circuit for relay HSP-A. Relay HSP-A closes contacts HSP2-A completing a circuit for SS-A, with the subsequent stopping operations outlined above. When the car has reached the second floor, brush FSB2-A (Fig. VI) contacts a second floor contact, and the second floor up reset relay 2UR is energized, the circuit being NS1-A, SE1-A, RS1-A, brush FSB2-A, the selector contact, and the coil of 2UR.

Relay HA-A drops out when SU-A drops out and opens its contacts SU1-A. Relay UM-A, however, does not drop out since it is a latching type relay. Thus UM1-A remains open preventing HCR from coming in.

If after the doors have opened and closed, there is no call in the system despite the up hall call previously registered, the call will proceed to the next higher floor, where it will be reversed. The sequence is as follows:

With the doors closed, a circuit is set up for SU through SS2-A, SE3-A, SYZ1-A (closed on On Call operation), 1F5-A (closed because the car is above the first floor), TF3-A (closed because the car is below the top floor), UP14, AUX5-A, SD5-A, switch SLQT-A, and the coil of SU-A. Note that AUX-A is maintained by latching contacts UM1-A. When SU-A is energized, however, it closes SU7-A, completing a circuit for AS-A. AS-A closes AS7-A, energizing the reset coil UMR-A for UM-A.

With SU-A energized, HL-A is energized, the circuit being UP16, AU2-A, SU10-A and HL-A. Note that AU-A is not energized because under the assumed conditions there is no service demand registered.

The car stars up from the second floor by the usual operation described above. As it approaches the third floor, relay HSP-A is brought in via HL5-A, brush SLU-A, SD9-A and SB8-A. HSP-A brings in SS-A, initiating the car stopping operation.

Since there is no higher call registered and the car was not stopped in response to an up hall call, relay AU-A drops out, causing AUX-A to drop out. AUX-A in dropping out opens AUX5-A and closes AUX4-A. AUX4-A brings in AD-A and through AD1-A, ADX-A. ADX-A closes ADX4-A so that the car is set for downward movement.

If on the second floor, an intending passenger pushed the car button for the top floor, the car would continue to that floor. Thus relay CT-A would be energized, closing CT4-A, and setting up a circuit for relay AU-A. Relay AU-A closes AU1-A bringing in AUX-A. AUX-A closes AUX5-A establishing a circuit for SU-A. It also opens AUX4-A preventing energization of AD and hence of ADX-A and SD-A.

Assume now that the car had been caused to go to the ninth floor by reason of a car call, and there being no further service demand, is caused to return to the first floor.

Slow-down of the car as it reaches the first floor is via brush SLD-A and the first floor selector contact, contacts SU11-A (closed since the car is moving down), contacts SB8-A and the coil of HSP-A. As the car reaches the leveling zone, the down leveling switch LUC-A is actuated, energizing LVD-A rather than LVU-A as in an upward stop.

In its downward travel the car was, of course, under the control of relay SD-A. As the car approached the first floor, selector switch SLQ1-A opened preventing energization of SD-A at that floor. The initial dropping out of SD-A, however, was in response to the opening of SS2-A during the slow down process.

By the operation of contacts SS6-A and LR3-A relay SE-A is energized, with the door opening and closing operations described above. If a passenger enters and presses a car button the car will start up to the indicated floor, SU-A being energized through SS2-A, SE3-A, CH1-A, TF3-A, UP14-A, AUX5-A, SD5-A, the top level selector switch SLQT-A, and the coil of SU-A.

The operation of a single car under the On Call program has just been described. It remains to be shown how a particular car is selected and dispatched from the terminal floor.

Assume that when Car A arrived at the first floor, there were no other cars present at the floor. Its arrival at the floor is accompanied by energization of 1F-A through the selector brush FSB3-A. Energization of 1F-A closes 1F1-A, establishing a circuit for BT-A and DR-A. This circuit is through IND6-A, 1F1-A, the coil of BT-A and the coil of DR-A. Energization of BT-A closes BT3-A and BT4-A. Energization of DR-A opens DR1-A; however DR1-A is a time delay contact and does not open until after BT3-A and BT4-A have closed. Hence a momentary circuit is established for the stepper relay STP-A.

The stepper relays are standard items of equipment. They function to move a pair of brushes (identified in the drawings by the numerals STPB1 and STPB2) over a series of contacts. Momentary energization of the stepper coil will move the brushes from home position to a first set of contacts; the next energization to a second set and so on. Energization of the reset coil STPR will return the brush to the home position. The stepper relays are also provided with two contacts, identified as STP21 and 22 which are closed as long as the stepper brushes are away from home position. Contacts STP21 and 22 are opened when the stepper is returned to home position by energization of the reset (STPR) coil.

One stepper relay is provided for each car. In the drawings STP-A is the stepper coil for Car A, STP-B is the coil for Car B and STP-C is the stepper coil for Car C.

As noted, each stepper has two brushes which move simultaneously through mechanical bridging. One brush STPB1 is used for bottom floor dispatching; the other, STPB2 for top floor dispatching.

The stepping relays are conventional items, purchaseable on the open market and no attempt will be made to describe their detailed structure. One suitable design is purchaseable from the C. P. Clare Company of Chicago, Ill., Catalogue No. DS-7, with bridging.

Returning to the assumed operation, energization of STP-A causes brushes STPB1-A and STPB2-A to move to the first position. This energizes relay DU-A. The circuit is through L3-A, coil of DU-A, BT6-A, brush STPB1-A and the first stepper contact, contacts U21, contacts U31, LUX3, and UP13.

Energization of DU-A closes DU5-A establishing a holding circuit for DU-A.

Energization of DU-A also closes contacts DU4-A, establishing a circuit for L-A through STP21-A which are latched close.

Energization of L-A closes L1-A, lighting the floor lantern at the lower floor, the load light in the car and the load light on the starter's panel. It also energizes LA-A.

It will be noted that as the car was stopped at the first floor it opened its doors to allow passengers to leave and then closed the doors. Energization of LA-A closes LA2-A in the circuit for SE-A but this does not bring in SE-A to initiate the door opening, even though the car is selected to be the next to leave because the system is on On Call operation and hence OC5 is open. If a service demand is registered at the first floor, however, AF-A is energized, as described above, and SE-A is brought in through AF1-A. A service demand for a floor above the first floor does not activate AF-A and thus will not cause the car to open its doors.

With Car A selected to be the next car out a signal from the dispatching interval timer and the registration of a service demand are necessary to cause it to be dispatched (assuming no car call is registered).

The dispatching interval timer is a device arranged to close a switch at stated intervals of time. One suitable device for this service is shown in Figs. XIV and XV. Referring to Figs. XIV and XV the timer comprises a timing motor 30 which drives a shaft 31 through a gear box 29. On the shaft 31 is keyed the driving side 32 of a conventional disc type clutch 33. The driven side 34 of the clutch 33 is keyed to one end of a second shaft 35 which is journaled in a support 36. To the other end of the shaft 35 is mounted a cam disc 37 to which is attached a coil spring 38. The disc 37 has a camming tooth 39 on its periphery. Two spring loaded switches TCS and TCE are mounted adjacent the camming disc 38, the arrangement being such that when the tooth 39 contacts TCE, that switch is closed and when the tooth 39 contacts TCS, it is closed.

The driving element 32 of the clutch 33 has a reduced section 44. A yoke 41 having arms 45 with rollers 46 is mounted on a pivot 47 adjacent the clutch, so that the arms 45 embrace the reduced section 44 and so that when the yoke 41 is moved counterclockwise about pivot 47, rollers 46 bear against the flanged surface 48 of the clutch, disconnecting the driving section 32 from the driven section 34.

A clutch magnet 49 is provided having a coil (Fig. VII) and an armature 43 which is arranged to move to the right in Fig. XIV when the magnet coil is energized.

The armature 43 is attached to a lower extension 42 of the yoke 41 so that energization of the magnet tends to rotate the yoke 41 counterclockwise against the action of a spring 40 also attached to the yoke extension 42.

In operation, with the apparatus as shown in Fig. XIV, contacts TCS are closed. This establishes a circuit for MR through TCS, LUX4, and TDX1. MR, being energized closes MR1 and opens MR2. MR2 in opening opens the circuit for the magnet coil. Spring 40 therefore rotates the yoke 41 clockwise, urging the driving member 32 of clutch 33 into contact with the driven member 34, causing disc 37 to rotate against spring 38. When tooth 39 has moved 180°, TCE is closed (TCS having been allowed to open). The closing of TCE establishes a circuit for TDX. TDX opens TDX1 dropping out MR. As MR drops out it closes MR2, bringing in the clutch magnet coil. The magnet moves its armature 43 to the right in Fig. XIV disengaging clutch 33. With the clutch disengaged, spring 38 rotates disc 37 counterclockwise (Fig. XV) closing TCS and causing the cycle to be repeated.

When in the operation of the dispatching interval timer just described, TDX was energized, it closed TDX3, bringing in LU. The circuit is through TDX3, UP8, LUX1, and the coil of LU. LU in turn closes LU1. Assume now there is a hall call, e.g. the ninth floor down signal, operated. AU-A then comes in, establishing a circuit for AUX-A. AUX-A closes contacts AUX2-A in the circuit for LUX. LUX is energized, the circuit being LU1-A, DU3-A, AUX2-A, SYX4 and LUX. LUX separated contacts LUX3 breaking the circuit for DU-A. DU1-A drops out extinguishing the first floor lantern and the load light in the car. DU2-A closes, establishing a circuit for STR-A, this circuit being through L1-A, DD2-A, DU2-A and STR-A. DU2-A in closing also lights the start light in the car. STR-A closes STR1-A, energizing SU-A (AUX5-A being closed by virtue of the hall call) and causing the car to start.

As the car moves away from the first floor, 1F-A drops out because the brush FSB3-A moves off the first floor contact. 1F1-A therefore opens, dropping out BT-A and DR-A. BT-A dropping out closes BT5-A, completing a circuit for the reset coil STPR-A of the stepping relay, returning the brushes STPB1-A and STPB2-A to their home positions. With STPB1-A and STPB2-A in the home position STP21-A and STP22-A are opened, STP21-A opens the circuit for L-A causing that relay to drop out. L1-A thereby opens, extinguishing the start light in Car A.

Assume now that there had been no call in the system. As a result the dispatching procedure would have been suspended with the energization of LU, because without AUX2-A closed, LUX could not be energized (the system being on On Call and hence UP11 open).

If now Car B arrives at the first floor, its 1F relay, 1F-B, will be energized. (The coil for this relay is not shown in the drawings.) 1F1-B will then be closed, bringing in BT-B and DR-B. The first effect of this is to actuate the stepping relay for Car A, STP-A, to move brushes STPB1-A and STPB2-A up another notch to the second position. The circuit for STP-A is through DR1-B, BT3-B, BT4-A, and STP-A.

Brushes STPB1-B and STPB2-B are also advanced to the first position, the circuit for STP-B being DR1-B, BT3-B, BT4-B, STP-B. This advance does not, however, bring in DU-B because when the brushes for Car A advanced to the second position, relay U2 was energized, opening contacts U21. The circuit for U2 coil was DU5-A, DU-A, BT6-A, STPB1-A, coil of U2, U31 contacts, LUX3, and UP13.

Because DU-B is prevented from coming in, Car A retains its next-to-go position in the dispatching order.

In similar manner if Car C next arrives at the dispatching terminal it will take its place behind Car B.

It should be noted, moreover, that there is no preference as between cars A, B, or C. If Car C had come in first, brushes STPB1-C and STPB2-C would be in the first position and the other cars would follow. Thus the present system is truly non-rotational and selects the first car to arrive as the first car to leave.

The functioning of the dispatching system from the top floor is somewhat different from that which has been described for the bottom floor. Assume Car A arrives at the top floor and that there are no other cars there. Brush FSB3-A engages the top floor contact energizing relay TF-A. TF-A closes contacts TF1-A, energizing TT-A and DR-A. TT-A closes TT3-A and TT4-A, establishing a circuit for STP-A, and thus advancing the brushes STPB1-A and STPB2-A to the first position. A circuit for DD-A is thereby established through L3-A, the coil of DD-A, TT6-A, brush STPB2-A, D21 contacts, D31 contacts, LDX3, TDX4, and ICX2.

DD-A closes DD4-A bringing in L-A. This circuit is through latched contacts STP21-A, DD4-A and the coil of L-A. L-A closes L1-A, and DD1-A being closed, the top floor lantern lights and the gong rings.

Since the system is on On Call operation, it is desired that the cars be dispatched from the top terminal without waiting for the dispatching interval timer signal. This is accomplished by a circuit for LD which runs through UP6, LDX1 and the coil of LD. LD closes LD1 setting up a circuit for LDX through LD1, DD3-A and the coil of LDX. LDX being energized opens LDX3, breaking the circuit for DD-A. DD-A dropping out closes DD2-A, energizing STR-A. STR-A closes STR1-A energizing SD-A and causing the car to move down as described above.

From the foregoing it will be seen that when the system is on On Call operation cars will park at the first or lower dispatching floor with their doors closed. Cars will be selected to leave in the order of their arrival at the first floor. If the hall button at the first floor is pressed the doors of whichever car is selected will open. If the demand for service originates at a higher floor, the car doors will not open at the terminal floor.

The selected car will be dispatched after a timed interval, provided there is a demand for service. If the dispatching interval has expired before the demand for service has been registered, the car will move immediately upon registration of a demand. Upon leaving the first floor the car will go to the highest call, reverse and then return to the lower dispatching floor. If no service demand is registered after a certain time the motor-generator set will shut down.

To set the car for a Balanced program the Traffic program selector TPSS on the starter's panel is moved to that position. This energizes relay BA. Relays OC and UP are now deenergized.

Assume that Car A has just returned to the lower terminal, i.e. the first floor. The stepping brushes STPB1-A and STPB2-A will be moved to the first position, as before, and DU-A will be energized. In this instance, however, the circuit for DU-A will be L3-A, coil of DU-A, BT6-A, brush STPB1-A, contacts U21 and U31, LUX3, TDX5 and ICX3. Thus DU-A is made subject to TDX.

L-A is energized through latched contacts STP21-A, and DU4-A. L-A closes L1-A setting up a circuit for the load lights, the first floor lantern for Car A and for relay LA-A.

As Car A returned to the first floor the doors opened in accordance with the sequence described above. After SS-A drops out, however, the car doors remain open even after the door timing interval has expired. This is because the car has been chosen as the next to leave and a holding circuit is established through AT5-A, OC5, DAM4, and LA2-A. OC5 is closed with the car not on On Call operation. LA2-A is closed when L1-A energized LA-A, as described above. DAM4 is closed because DAM is energized either (1) when there is no call in the system and a car is at the first floor or (2) when any car is moving. To elaborate on this last point, the registration of any service demand will energize SYC; or no service demand being registered SYC will not be energized. With SYC out, SYC1 will be closed. With Car A at the first floor BT7-A will be closed and thus a circuit will be established for SYY. SYY closes SYY1, energizing MDF. MDF closes MDF1, bringing in DAM.

If, on the other hand, any car is moving, its brake relay SB will be energized and one of the contacts SB2 will be closed, establishing a circuit for MDF. Occasional periods of non-operation, e.g. when the cars stop to let out passengers, will not affect DAM because MDF1 is a timed contact and does not open immediately MDF is deenergized.

If the system remains as it is with no service demand registered, the circuits will remain suspended in the positions indicated. Relay SYC will not be energized, as noted above, and SYC1 will be closed. SYC1 establishes a circuit for SYX through UP17. SYX opens contacts SYX2 in the circuit for the timing motor. Thus the dispatching timer does not function and no dispatching signal is given. If now a call is registered, say an up hall call for the ninth floor, SYC will be energized, SYC1 will open, SYX will drop out and SYX-2 will close. The timing motor will then resume operation, the circuit being SYX2, DN3, OC6 and the armature of the main timing motor. At the end of the timing interval TCE will be closed, energizing TDX. TDX opens TDX5 in the circuit for DU-A. DU-A drops out, closing DU2-A. DU2-A energizes STR-A, closing STR1-A.

When the call was registered, and SYC came in, SYC1 opened and SYY dropped out. This opened SYY1, dropping out MDF. After a period of time MDF1 opened, breaking the circuit for DAM and opening DAM4 in the circuit for SE-A. Because of the delay in MDF1 opening, however, SE-A had already dropped out through LA2-A opening when DU1-A opened the circuit for LA-A. As indicated above SE-A in dropping out initiates door closing. It also closes SE3-A, bringing in SU-A and RX-A. The circuit is SS2-A, SE3-A, STR1-A, UP15, RS8-A (closed when the car is at the first floor), SD5-A, SLQT-A, and the coils of SU-A and RX-A. The car thus starts up as described above.

If, in the operation described above, there was a service demand registered as the car reached the first floor so that the timing interval started and, if during the interval, this demand was answered, the operation of the timer would be suspended, but the timer would not be reset. Thus, although the timer motor armature would be deenergized by the opening of SYX2, the clutch 33 would not be disengaged since MR would remain energized and the friction of the gearing in gear box 29 would be sufficient to prevent the spring 38 from returning the timer to starting position.

It will be observed that when one car is at the bottom terminal, under Balanced operation, and no service demand has been registered, movement of all the cars not at the bottom terminal is also suspended.

Thus assume Car B is at the lower terminal and Car A is on its upward trip. Assume further that as Car A approaches the ninth floor, all service demands in the system are answered, so that SYC drops out.

SYC in dropping out closes SYC1, establishing a circuit for SYX through BT7-B and UP17. SYX closes SYX6 setting up a circuit for HL-A. HL-A closes HL2-A and as the car approaches the ninth floor HSP-A will be energized via brush SLU-A. HSP2-A will close, bringing in SS-A. SU-A will be dropped out as SS2-A opens. As the car reaches the final leveling zone, LR3-A closes bringing in SE-A and the doors open as described above. After the door timing interval has expired the doors close. As long as there is no call in the system, however, the car cannot start because a circuit cannot be completed for either SU–A or SD–A. Considering this point for a moment, since the car is not on attendant operation, the circuit for SU–A or SD–A must be via (1) STR1–A, (2) SYZ1, (3) CH1–A or (4) DAM3.

STR1–A cannot be closed because the dispatching timer has been stopped, as described above. (In any case it could not be used to start a car not at a dispatching floor.) SYZ1 is open because SYZ is energized, the circuit being BT7–B, SYC1, UP17, SYX3 and the coil of SYZ. CH1–A is open because, by hypothesis, there is no car call for Car A.

DAM3 is open because with no call in the system DAM is energized. Considering this circuit in greater detail, a circuit for SYY is set up through BT7–B, SYC1, and the coil of SYY. SYY closes SYY1, bringing in MDF. MDF closes MDF1, establishing a circuit for DAM.

Thus the car will remain at the ninth floor with its doors closed until a call is registered. Assume now that a down hall call for the second floor is registered. Contacts 2D2 of the second floor hall relay 2D (coil not shown) are closed and SYC is energized, opening SYC1 and thus dropping out SYY, SYX and SYZ. SYZ closes SYZ1, completing a circuit for SU–A. This circuit is SS2–A, SE3–A, SYZ1, 1F5–A, TF3–A, UP15, RS8–A (latched contacts) SD5–A, switch SLQT–A and the coil of SU–A. The car thus resumes operation to the top floor.

If the call registered were an up call for the ninth floor, the car would reopen its doors before moving. Thus, pressing the ninth floor up button energizes 9U. 9U closes 9U3, establishing a circuit for AFP–A though 9U3, brush FSB5–A, RS3–A, AS1–A and the coil of AFP–A. AFP–A closes AFP1–A establishing a circuit for SE–A and thus initiating door operation.

Under Balanced operation dispatching of a car from the top terminal takes place under much the same conditions as from the bottom terminal. Assume Car A arrives at the top terminal and there is no other car there. Brush FSB3–A energizes TF–A. TF–A closes TF1–A, energizing TT–A and DR–A. STP–A is thus energized, the circuit being DR1–A, TT3–A, TT4–A and STP–A. The stepper brushes STPB1–A and STPB2–A advance to the first position. A circuit is thus set up for DD–A through L3–A, DD–A, TT6–A, STPB2–A, D21, D31, LDX3, TDX4, and ICX2. DD–A sets up a circuit for L–A through STP21–A (latched) and DD4–A. L–A coming in closes L1–A, setting up a circuit for the load light, for the top floor lantern and gong and for LA–A. LA–A closes LA2–A, maintaining SE–A energized and thus keeping the doors open beyond the normal door closing interval. The circuit for SE–A is AT5–A, OC5, DAM4, LA2–A, SB10–A.

When the next timing interval expires TDX is energized opening TDX4 and dropping out DD–A. DD–A closes DD2–A thus energizing STR–A. STR–A closes STR1–A bringing in SD–A and RXR–A. Note that RS–A was reset as the car arrived at the top floor, because TF4–A in closing energized the reset coil RSR–A. The circuit for SD–A is thus SS2–A, SE3–A, STR1–A, UP15, RS9–A, SU5–A, SLQ1–A and SD–A.

SD–A being energized the car starts down.

It will be noted that only one dispatching signal is given and this will start cars from both the upper and lower terminals. In certain instances an up moving car will be in a position such that there are no calls above it; and there is no car at the upper terminal when the dispatching signal is given. In this case the car may be reversed at its highest call without waiting to reach the top terminal. The means by which this is accomplished is as follows:

Assume that Car A is approaching the ninth floor, when a dispatching signal is given, i.e. TDX is energized. This will close TDX2, setting up a circuit for LD. LD will close LD2, energizing HL–A. The circuit is LD2, AU2–A (closed since there is no higher call) SU10–A and HL–A. HL–A closes HL2–A and as the car approaches the ninth floor, the brush SLU–A energizes HSP–A, the circuit being HL2–A, SLU–A, SD9–A, SB8–A and HSP–A. HSP–A closes HSP1–A, which, with HL1–A establishes a holding circuit for HL–A. When in the slowing down sequence SS–A is energized, HCR–A will also be energized, the circuit being SS4–A, HL1–A, SYX1 SS3–A, RX1–A, UM2–A and HCR–A. HCR–A closes HCR3–A, establishing a circuit for RSR–A, the reset coil for RS–A. RS9–A is thus closed and RS8–A is opened. It should be noted that when the car was brought to a stop, SS–A dropped out, opening SS3–A and dropping out HCR–A. Since, however, SU–A had already dropped out, RS–A was not reenergized by the dropping out of HCR–A.

With RS9–A closed, when as part of the door closing SE3–A is closed, SD–A, rather than SU–A, is energized and the car starts down from the ninth floor.

It will be observed that if another car, say Car C, had been at the top floor, Car A would not have been reversed because TT2–C would have been open and LD would not have been energized.

Similarly if there had been a ninth floor up call, Car A would not have been reversed. A ninth floor up call would close 9U3, which, as the car neared the ninth floor would establish a circuit for HA–A, this circuit being 9U3, brush FSB4–A, SU1–A, SB1–A and the coil of HA–A. HA–A being energized closes HA1–A and thus brings in UM–A. UM–A opens latching contacts UM2–A in the circuit for HCR–A, preventing that relay being energized, and thus preventing RS–A being reset.

Assuming that Car A had been reversed below the top terminal by the procedure outlined above, it is desirable to insure that the next up car proceed all the way to the top terminal, regardless of whether or not there is an actual demand for service above it when the dispatching signal is given. To accomplish this contacts HCR1 are provided in the circuit for the top floor hall relay TD. Thus when Car A was reversed and HCR–A was energized as described above, HCR1–A was closed energizing latching relay TD. This in effect registered a top floor hall call preventing the next up car, e.g. Car B, from being reversed at a floor below the top floor.

The foregoing description shows how a car may be dispatched from either terminal floor by a dispatcher arranged to give dispatching signals at regular intervals of time. The present system also provides means for dispatching the car before any dispatching signal is given, if the car has been loaded to a given weight.

As noted above, each car is provided with a switch (LWS–A in Car A) which will close when the car has taken on a given weight. Assume that Car A is at the dispatching floor and has been selected as next to leave so that its doors are open and its loading light is on. When the car has taken on a predetermined load, LWS–A will close. Closing of LWS–A will bring in LW–A, the circuit being IND5–A, LWS–A, LWT2–A and LW–A. LW–A will close LW2–A and open LW6–A causing a dispatching signal to be given, i.e. causing STR–A to be energized.

The opening of LW6–A also causes LA–A to drop out, opening LA2–A in the circuit for SE–A. SE–A is thereby deenergized causing the doors to close and also closing SE3–A, starting the car up.

It may be noted that as the car starts and the brake is lifted, LWT–A is energized, by the closing of SB12–A. LW does not drop out, however, because of a holding circuit through AS8–A (closed with SU–A or SD–A) and LW5–A. LW–A brings in LW4–A, bringing in NS–A.

NS–A opens NS4–A preventing the car from stopping for any but car calls.

As the car comes into a stop in answer to a car call, SU–A or SD–A drops out, opening AS8–A and thus dropping LW–A. As the brake goes on, LWT–A drops out with the opening of SB12–A. LWT2–A, however, is timed closed, so that LW–A cannot pick up until after the doors have opened and the passengers have had a chance to get out. If an equivalent number gets in, so that the load remains the same, LWS–A will be closed and LWT2–A on closing will energize LW–A so that the car will again stop only for car calls. If, however, the car load is lightened by the time LWT2–A closes, LW–A will not be energized and the car will stop for hall calls in the usual manner.

When a car is dispatched by the load weighing device, it is desirable to reset the dispatching interval timer to compensate for this premature movement. The relays TR and BTR have this function.

Assume that, on Balanced operation, Car A has been dispatched from the lower terminal by the load weighing circuits just described. Since TDX has not been energized DU–A will remain energized. Since the car is moving, SB–A and AS–A are energized. L–A remains energized for a short time after the car has moved from the lower terminal because STP21–A remains closed until the stepper is reset. L1–A is therefore closed and a circuit is established for TR–A, this circuit being L1–A, DU1–A, AS2–A, SB3–A and TR–A. TR–A being energized opens TR1–A in the circuit for BTR. BTR, falling out, closes BTR3, setting up a circuit for TDX. TDX opens TDX5 breaking the circuit for DU–A. TDX also opens TDX1, dropping out MR. MR opens MR2, deenergizing the clutch magnet on the timer and resetting the timer.

With DU–A out and DU1–A opened the circuit for TR–A is opened and it drops out, closing TR1–A and returning BTR to its normally energized status. BTR3 is thereby opened and TDX returns to control by TCE.

The relays TR and BTR also serve to maintain the system in balance by dispatching a car from the upper terminal whenever a car has been caused to move from the lower terminal by its load weighing mechanism. Thus, as pointed out above, BTR in falling out energizes TDX. TDX, being energized, not only breaks the circuit for the DU relays but also for the DD relays. If, therefore, a car is at the top floor and has been selected as next to leave it will be dispatched in the regular manner by the closing of its DD2 contacts.

It may be noted that the load weighing feature described will function on all programs except when the car is on independent service.

From a consideration of the foregoing it will be seen that on Balanced operation a car coming into the lower or upper terminal will open its doors to discharge passengers. If it is the first car to arrive it will be selected as the first car to leave and will retain its doors open. If there is another car already there, the arriving car, having discharged its passengers, will close its doors until it is selected.

Cars are selected to leave each terminal in the order of their arrival at the terminal and are dispatched from both terminals upon the expiration of a predetermined dispatching interval. Alternatively if a car is loaded to a predetermined extent prior to the giving of a dispatching signal, it may be caused to depart from the terminal by reason of its having taken on that load. In this case the system also provides for the simultaneous dispatch of a car from the opposite terminal.

The cars make full trips from one terminal to the other stopping in their upward travel for up hall calls and car calls and in their downward travel for down hall calls and car calls, provided that if a car is loaded beyond a predetermined amount it will stop only for car calls, and provided further that if an upwardly moving car has no car or up hall calls above it, and there is no car at the upper terminal, it will stop at the next available floor and reverse upon a dispatching signal being given.

In accordance with one particular feature of the invention, if there is a car at the lower terminal and if there is no demand for service in the system, all moving cars will stop at the next available floor, open and reclose their doors and remain motionless. The dispatching interval timer will suspend its operation and hold its position. When a service demand is registered, the cars will resume their movement in the same direction they left off. If a service demand originates at the floor where a car is standing, the doors will reopen to admit the intending passenger, provided the service demand is for the direction in which the car is to move. If it requires movement in the opposite direction the car doors will not reopen and the demand will be met by the next available car travelling in the appropriate direction.

Upon registration of a service demand the dispatching timer will resume timing of the balance of the interval.

Assume now that the traffic program selector is moved to the Up Peak position.

The UP relay will then be energized.

Assume Car A arrives at the lower terminal and there is no other car there. It will be selected as the next car to move and the stepping brushes STPB1–A and STPB2–A will be moved to the first position. DU–A will be energized, the circuit being L3–A, DU–A, BT6–A, STPB1–A, U21, U31 contacts, LUX3 and UP13. When the car arrived at the lower terminal its doors opened in accordance with the usual sequence described above. However, since the car was selected to be the next to leave they were retained open even after the usual door timing interval. As in the Balanged program this was achieved by keeping SE–A energized, the circuit being through OC5, DAM4 and LA2–A.

Assume now that the dispatching signal is given. It may be pointed out that a dispatching signal will be given whether or not there is a call in the system. Thus if there is no call registered SYC1 will be closed, but SYX and SYZ will not be energized because on Up Peak operation, UP17 will be open. Since SYX is not energized, SYX2 will remain closed and the timing motor will continue to run.

When TDX is energized by the closing of TCE, TDX3 is closed, establishing a circuit for LU. LU closes LU1 establishing a holding circuit for itself. If a call is registered, AUX2–A will be closed and LU1 will also bring in LUX, the circuit being LU1, DU3–A, AUX2–A, SYX4 and LUX. LUX opens LUX1 dropping out LU. LU in dropping out opens LU1. LUX also opens LUX3, breaking the circuit for DU–A. DU–A dropping out closes DU2–A, energizing STR–A and closing STR1–A. DU–A in dropping out also opens DU1–A, deenergizing LA–A. LA–A dropping out opens LA2–A, dropping out SE–A.

The dropping out of SE–A closes SE3–A completing a circuit for SU–A. This circuit is SS2–A, SE3–A, STR1–A, UP14, AUX5–A, SD5–A and SU–A. The car therefore moves upwardly.

It should be noted that if there had been no call in the system, Car A would not have been dispatched from the lower terminal. Thus when LU closed LU1, no circuit would have been set up for LUX because AUX2–A would remain open.

On Up Peak operation, an upwardly moving car will move only as high as its uppermost call and will then reverse and return to the ground floor. To illustrate, assume Car A approaches the ninth floor and there is no longer a service demand for the ninth or higher floors. In this situation relay AU–A will not be energized. Note that AU–A will not be energized even if there is a demand for a lower floor because the SLS switches (Fig. II) for lower floors will have been opened. Since AU–A is not energized AU2–A will remain closed and HL–A will be energized. The circuit for this is UP16 (closed on Up Peak) AU2–A, SU10–A and the coil of HL–A. HL–A closes HL2–A and as the brush SLU–A approaches the ninth floor, slowdown is initiated. Specifically HSP–A is brought in closing HSP2–A and HSP1–A. HSP2–A brings in SS–A. After stopping in the usual manner, the car opens and closes its doors. When, as part of the door closing sequence, SE–A drops out, closing SE3–A, a circuit is set up for SD through SS2–A, SE3–A, SYZ1, 1F5–A, TF3–A UP14, ADX4–A, SU5–A, SLQ1–A and the coil of SD–A. The car therefore moves down.

If a car has reached the top terminal, it is immediately dispatched therefrom. No signal from the dispatching interval timer is required. Thus assuming Car A reaches the top floor, TF–A is energized by brush FSB3–A, bringing in TT–A and DR–A. The stepper relay STP–A is thus energized and stepper moves up a notch to energize DD–A, the circuit being via LDX3, TDX4 and ICX2. L–A is brought in by DD4–A, closing L1–A.

Since the system is on Up Peak operation the relay LD is energized, the circuit being UP6, LDX1, LD, so that LD1 is closed. When DD–A is energized DD3–A closes, bringing in LDX. LDX opens LDX3–A. DD–A thus falls out, closing DD2–A and energizing STR–A. STR–A closes STR1–A completing a circuit for SD–A; this circuit being SS2–A, SE3–A, STR1–A, UP14, ADX4–A, SU5–A, SLQ1–A and SD–A. The car thus moves downwardly.

It was pointed out earlier that under Up Peak operation, if there is no call in the system, operation of the dispatching interval timer is not suspended, as it would be on "Balanced" operation. It will also be noted that movement of the cars is not suspended. Thus it will be recalled that on Balanced operation, the energization of relay SYZ (which was effected when there was no call in the system and at least one car at the lower terminal), opened SYZ1 and thus prevented a circuit being established for SU–A or SD–A. On "Up Peak," however, contacts UP17 are open; thus SYZ cannot be energized, and cars will continue their movement even though no call exists until all cars are at the bottom terminal.

A consideration of the foregoing indicates that on Up Peak operation a car on arrival at the bottom terminal will open its doors to discharge passengers. If it is selected to be the next car to leave, i.e. if there are no other cars at the terminal when it arrives, it will keep its doors open until it receives a signal from the dispatching interval timer and there is a service demand in the system. When both of those conditions obtain the car will close its doors and move up.

On its upward travel the car will go only as high as its highest call. As soon as there is no call above it, it will stop at the next floor and reverse, moving back to the bottom terminal. If a car reaches the upper terminal it is immediately reversed and returned to the bottom terminal even if no dispatching signal has been given.

A car may be dispatched from the bottom terminal before the dispatching signal has been given from the dispatching interval timer, provided it has taken on a specified load, in the manner described for Balanced operation.

To set the car on Down Peak, the selector switch TPSS on the starter's panel is moved to the Down Peak position. This energizes the DP relay.

Assume now Car A arrives at the lower terminal. 1F–A is energized closing 1F1–A and bringing in BT–A and DR–A. Stepping relay STP–A is thus activated and the stepper brushes STPB1–A and STPB2–A move up one notch. DU–A is brought in, the circuit going through LUX3, TDX5 and ICX3.

With DP energized, DP8 is closed and LU is energized. LU brings in LU1. When DU–A is energized it closes DU3–A preparing a circuit for LUX. This circuit is LU1, DU3–A, UP11, SYX4, LUX. It will be noted, however, that this circuit cannot be completed unless a demand for service is registered, for if there is no demand for service SYC1 will be closed, SYX will be energized and SYX4 will be open. Assuming a demand for service exists, LUX will be energized. LUX opens LUX3 dropping out DU–A.

DU–A dropping out closes DU2–A establishing a circuit for STR–A.

When the car arrived at the terminal the doors opened. They remain open until DU–A in dropping out opens DU1–A and hence drops out LA–A. When LA–A drops out, it opens LA2–A, breaking the holding circuit for SE–A through AT5–A, OC5–A, DAM4, LA2–A and SB10–A. The doors thus close.

Energization of STR–A closes STR1–A. When SE–A drops out in the door closing sequence, SE3–A close, bringing in SU–A. The circuit is SS2–2, SE3A, STR1–A, UP15, RS8–A, and SU–A, RS8–A being closed with the car at the bottom terminal. The car thus starts up without receiving a dispatching signal from the timer.

In its upward movement, the car will stop for up hall calls and car calls. Normally, it will proceed all the way to the top terminal, regardless of whether or not there is an actual service demand ahead of it, as long as there is any service demand in the system.

If there is no service demand in the system and if there is a car at the lower terminal, the upwardly moving car will stop at the next floor. This is effected as described above. The absence of a service demand energizes SYC, closing SYC1. With a car at the bottom floor SYX is energized, closing SYX6 and bringing in HL–A. HL–A closes its contacts in the slowdown circuits bringing in SS–A to cause slowdown and stopping at the next available floor. The doors open and close in the usual manner and the car remains motionless, since SYZ1 is open. Upon registration of a service demand SYX falls out and the car resumes operation in the manner described above.

It will also be noted that on the Down Peak program operation of the timing device is suspended, when there is no service demand, by opening of SYX2. In this the Down Peak program is like the Balanced program and dissimilar to the Up Peak program.

Upon arrival at the top floor, Car A will join in the dispatching program. Assume Cars B and C are already at the top terminal. Car A on arriving energizes TF–A and therefore TT–A and DR–A.

Since Cars B and C were already at the terminal the brushes STPB1–B, STPB2–B, STPB1–C and STPB2–C would be in the first and second positions on the stepper when Car A arrived. Whether the —B or —C brushes would be in the first position would of course depend on which car, of B and C, had arrived first. Assume Car C arrived before Car B so that its brushes are in the second position. The arrival of Car A moves the —C brushes into third position and the —B brushes into second position. The —A brushes take up the first position.

Under these conditions, contacts D3 and D2 are open so that DD–A cannot be energized. Car A, on arriving, opens its doors to allow passengers to disembark and, after the door timing interval has expired, closes its doors and remains parked.

After the next dispatching interval has expired, Car C moves out.

As Car C moves out, its TF–C relay (not shown) is deenergized opening TF1–C and breaking the circuit for TT–C and DR–C. TT–C in dropping out opens TT3–C and TT4–C and closes TT5–C. TT5–C completes a circuit for stepper reset coil STPR–C, this circuit being through latched contacts STP22, TT5–C and BT5–C.

The stepping relay for Car C is thereby reset and the brushes STPB1–C and STPB2–C are returned to home position.

It will be noted that as an incident of the dispatching of Car C, the circuit for relay D3 is broken. D31 is therefore closed, enabling a circuit to be established for DD–B and so moving Car B into next-to-leave status. Similarly when Car B is dispatched, relay D–2 is de-energized, closing D21 and enabling DD–A to be energized.

The circuit for DD–A is L3–A, DD–A, TT6–A, STPB2–A, D21, D31, LDX3, TDX4, ICX2. DD–A, on being energized, closes DD4–A, bringing in L–A. L–A closes L1–A, lighting the load lights for Car A, sounding the top floor gong and energizing LA–A.

LA–A, on being energized, closes LA2–A, establishing a circuit for SE–A and causing the doors of Car A to reopen.

When the timing interval expires, TDX4 opens, dropping out DD–A, DD–A, in dropping out, closes DD2–A and opens DD1–A. DD1–A, in opening, extinguishes the load lights and drops out LA–A. LA–A opens LA2–A, initiating door closing.

Closing DD2–A energizes STR–A. STR–A closes STR1–A so that when SE–A, dropping out in the door closing sequence, closes SE3–A, SD–A is energized. The circuit is SS2–A, SE3–A, STR1–A, UP15, RS9–A, SU5–A, SLQ1–A and SD–A. Car A thus starts down.

While under normal circumstances, cars are time dispatched from the upper terminal in the manner just described, they may also be dispatched before a dispatching interval expires if they have been loaded to a specified degree. The sequence by means of which this is accomplished is similar to that described above under Balanced operation and it is believed that further elaboration is unnecessary.

If on Down Peak Program, a dispatching signal is given and there is no car at the top floor to receive it, an upwardly moving car will be caused to stop at the next floor and reverse, provided no call for a higher floor has been registered.

Thus assume Car A is approching the ninth floor and there is no car at the top floor. Assume further that TDX is energized by the timer. TDX2 will be closed, energizing LD. LD will close LD2, establishing a circuit for HL–A. HL–A will close its contacts HL2–A and the car will be brought to a stop at the ninth floor. Moreover, as the car is brought to a stop, HCR–A will be brought in, the circuit being HSP1–A, HL1–A, SYX1, SS3–A, RX1–A and UM2–A. As noted above HCR–A by energizing the reset coil RSR–A causes the car to be reversed.

From the foregoing description, it will be seen that under Down Peak operation, cars are dispatched from the lower dispatching floor immediately upon arrival provided there is a demand for service. They are time dispatched from the upper dispatching floor in the order of their arrival at that floor; provided that they may be dispatched ahead of time if they have been loaded to a predetermined extent and provided further that if a dispatching signal is given when there is no car at the upper terminal, an upwardly moving car will be caused to stop and reverse, provided there are no higher calls which it can answer.

If a situation arises when there is no demand for service in the system, movement of all cars and operation of the dispatching interval timer are suspended until a call is registered.

To put the car on "Heavier Up" or "Heavier Down" programs, the program selector (Fig. VIII) TPSS is moved to the appropriate position. The HU or HD relays are thereby actuated. Under HU or HD operation the system functions exactly as under the "Balanced" program described above, except that the dispatching interval is shortened.

Thus, if the system is put on Heavier Up, HU is energized, closing HU7 and HU6. These contacts energize an auxiliary dispatching interval timer identical in every respect to that shown in Figs. XIV and XV, except that the motor of the auxiliary timer is arranged to run at a higher speed so that the timing interval is shorter. Thus, MRA is the coil for the magnet of the auxiliary timer corresponding to MR on the main timer. TCSA corresponds to TCS, TCEA corresponds to TCE and ICX corresponds to TDX.

HU, being energized, also closes HU8 and opens HU9. HU8 establishes a shunt circuit around contacts TDX5 making those contacts ineffective in the circuit for the DU relays. HU9, in opening, makes ICX3 determinative for the energization of the DU relays.

Thus, assuming the system is on Heavier Up operation, and Car A is selected as next to leave from the bottom terminal, the auxiliary timer will be running and, when it has reached its full cycle, TCEA will be closed, actuating ICX. ICX will open ICX1, dropping out MRA, closing MRA2, and energizing the clutch magnet. The timer will then spring back to its starting position, closing TCSA. ICX will, at the same time, drop out since TCEA will open when the timer cam disc reverts to starting position. With ICX deenergized, ICX1 will thus be closed, energizing MRA. MRA opens MRA2 deenergizing the clutch magnet and restarting the timing interval.

When ICX was energized, ICX3 opened, dropping out DU–A. DU–A, through the sequence described above, starts the car upwardly.

Note that in the dispatching from the top floor under Heavier Up programming, the main timer will control since HD is not energized, HD9 is closed and hence opening of ICX2 will have no effect on the DD relays.

On Heavier Down operation, the program selector TPSS (Fig. VIII) is moved to the appropriate position, bringing in relay HD. HD closes contacts HD7 and HD5, making the auxiliary dispatching interval timer operational. It also closes HD8 and opens HD9. The effect of this is to make the auxiliary timer contacts ICX2 effective to control the DD relays and to render the main timer contacts TDX4 ineffectual for this purpose.

Thus, if Car A is at the top terminal and is selected to leave, energization of ICX will open ICX2, causing DD–A to drop out and the car to start down. Opening and closing of TDX4, on the other hand, will have no effect since HD8 provides a circuit around them.

Note that on Heavier Down operation, the main timer and not the auxiliary timer is effective at the bottom terminal, since HU9 provides a shunt circuit around the auxiliary timer contacts ICX3.

Thus, on Heavier Up operation the system functions as it does on a Balanced program, except that the dispatching interval at the bottom terminal is abbreviated. On Heavier Down operation the system functions as on a Balanced program except that at the top terminal the dispatching interval is shortened.

Before describing the functioning of the Automatic Programming arrangement, certain special features of the system will be described.

As pointed out above, it occasionally happens that a malfunction of the dispatching system will cause complete failure of all service in the building. To guard against such loss of service, a dispatcher failure feature has been provided. This feature hinges on energization of the relay MDF. MDF will be energized if either: (1) there is no call in the system and at least one car is at the lower terminal, or (2) at least one car is moving. If neither of these conditions obtains, i.e. if there is a call in the system or if there is no car at the bottom terminal; and if no car is running, MDF will drop out.

To elaborate somewhat further on this, a circuit for MDF may be completed through: (1) any of the SB2 contacts, which are closed when the brake is lifted and remain closed until the car is stopped, or (2) through SYY1. SYY1 is closed if SYY is energized. SYY is energized if SYC1 is closed and if any of the BT7 contacts is closed. SYC1 is closed if SYC is not energized. SYC is only energized as long as there is a call in the system. The BT7 contacts for any car are closed when that car is at the first floor, provided it is not on independent service.

Assuming then that none of the cars is running; and that there is a call for service, or that there is no car at the bottom terminal, MDF will drop out. After a suitable time interval contacts MDF1 will open, deenergizing relay DAM. DAM, in dropping out, closes contacts DAM3 in the circuit for SU–A (or SD–A) and similar contacts (not shown) in the circuits of cars B and C, causing the cars to move in whichever direction they are set to move. DAM, in dropping out, also closes DAM1, completing a circuit for a warning light in the starter's panel.

Starting of the cars will close the SB2 contacts, bringing in MDF and DAM. DAM, being energized, opens DAM1. Relay DFS has a holding circuit through DFS1, however, so that the warning light in the starter's panel remains lit until it is extinguished by manual operation of a reset button.

Another source of malfunction, leading to complete failure of service, is the failure of hall calls to be communicated to the cars through a failure in the electrical supply to the hall buttons. This is particularly inconvenient in the present system where movement of the cars may be dependent on a service demand being registered. To avoid this difficulty, a relay CSF is placed across the common lines from which current is furnished to the hall call relays. A failure in either of these lines closes a series of contacts CSF1, CSF2, etc. which in effect establish false car calls for all the floors. If desired, all the cars can be given calls for all floors, or certain cars given calls for certain floors. The result is that some car will stop at each floor and, although service will be slowed, it will not be completely stopped.

On certain occasions, it may be desired to have a car removed from the control system and operated independently. In the present system a hand-operated switch [INDS–A (Fig. IV)] in each car is provided for this purpose. Operation of the switch energizes the IND relays for each car. These relays close their IND4 contacts, energizing the AT relays for each car, so that the cars so set are capable of independent operation by an attendant.

If a car is set for independent operation and thereby taken out of the dispatching system, it is desirable to adjust the dispatching interval to compensate for this fact.

In the present system, this situation is provided for by the DN relay. If the system is not on "On Call" operation, none of the cars is on independent service and all of the cars' hoisting motor fields are energized, a circuit is established for DN. This circuit is through OC1, IND1–A, P1–A, IND1–B, P1–B, IND1–C, P1–C and the coil of DN. Thus, under normal circumstances, DN is energized. Contacts DN1, in the circuit for the main timer motor, and DN2 in the circuit for the auxiliary timer motor are open, while contacts DN3 and DN4 are closed. Closing of contacts DN3 and opening of DN1 removes a segment of the resistor R100 (Fig. VII) from the circuit of the main timer motor armature; closing of DN4 and opening of DN2 removes a segment of resistor R101 (Fig. VII) from the circuit of the auxiliary timer motor armature.

If now one of the cars is put on independent service, one of the IND1 contacts, say IND1–A will be opened, causing DN to drop out, opening DN3 and DN4 and closing DN1 and DN2. This inserts segments of the resistors R100 and R101 in the circuits for the timing motor armatures, thus slowing down the motors and increasing the dispatching interval.

It will also be noted that if one of the cars is shut down so that its P relay is not energized, the corresponding P1 contact in the circuit for DN will be opened and DN will be deenergized.

It will further be noted, in passing, that as the system is arranged, on Down Peak operation the dispatching interval is quite short, since the contacts DP10, closed on Down Peak operation provide a shunt around most of resistor R100. Similarly, on On Call program, the dispatching interval is long, the closing of OC4 and opening of OC6 placing the maximum length of R100 into the timing motor armature circuit.

As pointed out the present system can be operated either with or without operators. In the preceding description the operation of the system without operators has been described. If it is desired to have one or more cars function under the control of operators this is done by closing the attendant switch (e.g. ATS–A, Fig. IV) in each car. This energizes the AT relays such as AT–A. The effect of these relays is in general to put the starting of the car under the control of the attendant. Thus energization of AT–A opens AT5–A making the dispatching circuits ineffective to control door movement. It also closes AT6–A setting up a holding circuit for relay SE–A. Further, it closes AT2–A making it possible for the attendant to start the car by means of the start switch (Fig. III) in the car.

When under attendant operation the cars are at terminal floors, the signals to load the car and to start the car are given to the attendants by the load lights and the start lights and bells in the car. The attendant may then press his start switch. This will energize ST–A. ST–A opens ST2–A, dropping out SE–A and causing the doors to close. SE–A in dropping out also closes SE3–A permitting SU–A or SD–A to be energized, assuming the other conditions relating to the particular program under which the system is operating have been met.

It will be recalled that on all programs except Up Peak and On Call, all cars at intermediate floors suspend movement if no service demand is registered, provided there is a car at the bottom terminal. This feature is also present with attendant operators. Thus with no calls in the system SYC is not energized and SYC1 is closed. With any car at the bottom floor one of the BT7 contacts is closed. Thus a circuit is established for SYX. SYX closes SYX4, establishing a circuit for the no call light in Car A (assuming Car A to be on attendant operation). The circuit is SYX4, AT7–A and the bell and light for Car A. This indicates to the attendant that the car will stop at the next floor, even though there is no demand for service at that floor. The car will stop at the next floor through the HL–A relay in the manner described above. Closing of SS6–A and LR3–A establish a circuit for SE–A. SE–A closes SE6–A energzing O–A. Note, however, that the doors will remain open, even though O–A is dropped out by limit switch OL–A because a holding circuit is set up through CL–A (closed with the doors opened), AT6–A, SB11–A, ST2–A and SE–A.

When a demand for service is registered, SYX drops out closing SYX5 and opening SYX4. When SYX5 closes, the resume service bell rings in Car A, notifying the attendant to resume operation. This he does by pushing his start switch, energizing ST–A. ST2–A is thereby opened, dropping out SE–A causing the doors to close and the car to start.

Having described how the system will operate under the six different programs; Up Peak, Heavier Up, Balanced, Heavier Down, Down Peak and On Call; and having described various special operations of the system, it remains to be pointed out how the system can be shifted automatically from one program to another.

As pointed out earlier in this specification, there are three means of control, any of which, under the proper conditions, can determine the program under which the system will operate. The control parameters are (1) Load weighing
(2) Service demand
(3) Hour of the day Before any of these can be effective it is first necessary that the system be set for automatic operation. This is done by moving the traffic program selector TPSS on the starter's panel to the Automatic position. Doing this energizes the AUT relay which closes AUT1 and AUT2, the closing of which is necessary for the automatic control elements to energize the program relays UP, HU, BA, HD, DP and OC.

To start first with the load weighing or "Peak Capacity" feature, this operates to change the mode of operation of the system from some other mode to Up Peak, if two or more upwardly moving cars are loaded to capacity. Similarly, it will change the system to Down Peak, from some other mode of operation, if two or more downwardly moving cars are loaded to capacity. If there are an equal number of cars loaded in each direction, Up Peak operation will prevail over Down Peak.

To elaborate on the circuits necessary to provide this service, assume that the system is on Balanced operation and Cars A and B, moving upwardly, both become loaded to capacity. The load weighing switches LWS–A and LWS–B (not shown) in each car will therefore be closed, energizing LW–A and LW–B (not shown).

LW–A closes LW1–A and LW–B closes LW1–B, thus establishing circuits for UW–A and UW–B. UW–A closes UW1–A and UW–B closes UW1–B, establishing a circuit for UPP. UPP closes UPP2 and opens UPP3. UPP3, on opening, will drop out BAT which would have been energized had the system been on Balanced operation, as will be seen below. UPP2, on closing, brings in UPT.

When UPT is energized, it closes UPT1 and UPT2, setting up a circuit for the UP relay. This circuit is DPCX2 (closed because the program clocks have not called for Down Peak operation), UPCX4 (closed because the program clocks have not called for Up Peak operation), AUT2, UPP1, UPT2, UPT1, UPCX3 and the coil of the UP relay. The UP relay, coming in, puts the system on Up Peak operation.

Assume now, that Car A reverses its direction and becomes loaded to capacity in the down direction. Assume that Car C is also loaded to capacity in the down direction. Under these conditions LW1–A and LW1–C will be closed and DW–A and DW–C will be energized. Also, UW–A will be dropped out when SU–A is dropped out as part of the stopping operation.

The deenergization of UW–A opens UW1–A, dropping out UPP. UPP in dropping out opens UPP2, dropping out UPT. UPT will open UPT2.

Under the circumstances assumed, i.e. that a Down Peak condition supersedes the Up Peak condition, DPP is energized by DW–A and DW–C closing DW1–A and DW1–C. DPP closes DPP3. When, as a consequence of UPP dropping out, UPP3 closes, a circuit is established for DPT. DPT closes DPT1 and DPT2, establishing a circuit for DP through DPCX2, UPCX4, AUT2, DPP1, DPT2, DPT1, DPCX3 and the coil of DP. DP, being energized, puts the system on Down Peak operation. It also opens DP3, causing UP to drop out.

If a condition arose in say a four car system under which there were two loaded cars traveling in each direction, both UPP and DPP would be energized. However, UPP would open UPP3, preventing DPT from being energized and hence the Up Peak program would prevail.

If there are not two loaded cars traveling in either direction, determination of the mode of operation falls to service demand as determined by the traffic demand computer circuits.

Broadly speaking, the function of the traffic demand computer is to detect and evaluate demands for service and then to select the type of program which is best suited to the particular demand. More particularly, in the arrangement shown in Fig. X a first set of three current sensitive relays 1P, 2P and 3P are arranged in series with each other. Current is fed to these relays through contacts TD1, 9U1 etc. which are arranged in parallel with each other and closed by the floor relays at each floor. Car call contacts CT1–A, C91–A etc. for each car are also arranged in parallel with the above hall call contacts and feed to relays 1P, 2P and 3P.

A second set of current sensitive relays 1N, 2N and 3N are arranged in series with each other and are fed through down hall contacts 9D1, etc. and an up hall contact for the first floor, 1U1. Car call contacts also may feed to 1N, 2N and 3N, the arrangement being such that when a car is moving up, its car calls will affect the P relays and when it is moving down, the N relays.

Resistors RT–A, R9–A etc. are arranged in the circuits of the car call contacts CT–A, C91–A etc.; and other resistors RTD, R9U etc. are arranged in the circuits of the hall call contacts TD1, 9U1 etc. The value of the resistors is selected so that the closing of a hall call contact will allow twice (or whatever value is chosen) the current to flow to the current sensitive relays as will the closing of a car call contact.

The current sensitive relays are arranged with shunt circuits so that more current is required to energize 2P and 2N than 1P and 1N and still more to energize 3P and 3N. The particular value of the current required to bring in the 1, 2, and 3 relays must be chosen with regard to the current obtained by closing a definite number of hall call or car call contacts. One suitable arrangement is shown in the following table:

*Calls required to operate current sensitive relays*

| Relay | Pick up (Min.) | | Drop out (Max.) | |
|---|---|---|---|---|
| | Hall Call | Car Call | Hall Call | Car Call |
| 1N or 1P | 2<br>1<br>0 | 0<br>2<br>4 | 1<br>1<br>0 | 0<br>1<br>3 |
| 2N or 2P | 3<br>2<br>1<br>0 | 0<br>2<br>4<br>6 | 2<br>1<br>0 | 1<br>2<br>4 |
| 3N or 3P | 4<br>3<br>2<br>1 | 0<br>2<br>4<br>6 | 3<br>2<br>1<br>0 | 0<br>2<br>4<br>6 |

In the table, the requirements for energization of the current sensitive relays are expressed in terms of calls. Obviously the actual value of the resistors used may be chosen as desired, having in mind the line voltage and the requirements of the particular relays.

The system will be best understood by considering a particular case. Assume that there are three up hall calls registered and two down hall calls; that Car A and Car B are moving up and have three car calls each and that Car C is moving down and has four car calls. In this situation there is a total of 3 up hall calls and 6 up car calls so that 1P, 2P and 3P would all be energized. There are two down hall calls and four down car calls so that 1N, 2N and 3N would also be energized.

To translate this into program selection, the program integrating timer circuits must be considered.

Assuming there has been no signal from the load weighing devices, whose operation has been explained above; UPP2 is open and UPP3 is closed. Similarly DPP3 is open and DPP2 is closed.

Since 3P and 3N are both energized, 3P6 and 3N4 are both closed so that a circuit is established for BAT, this circuit being UPP3, DPP2, 3P6, 3N4 and BAT. Note that UPT cannot be energized since both UPP2 and 2N1 are open; that DPT cannot be energized since both 2P2 and DPP3 are open; that HUT cannot be energized since 3N3, and 3P4 are open; and that HDT cannot be energized since 3N7 and 2N7 are open.

With BAT energized, a circuit is established for BA through DPCX2, UPCX4, AUT2, HD3, HU2, BAT2, BAT1 and the coil of BA, BA being energized puts the system on Balanced operation.

Assume now that a situation arises while the system is on balanced operation in which there are two up hall calls registered and four car calls in upwardly moving cars. Assume there is one down car call in a downwardly moving car and no down hall calls. Two up hall calls and four up car calls bring in 3P, 2P and 1P. One down car call is insufficient to bring in 1N.

Since 3P7, 2P5 and 3N4 are open, BAT cannot be energized and drops out. Since 3P1 and 2N1 are both closed UPT is energized, closing UPT1 and UPT2. A circuit is therefore established for UP through DPCX2, UPCX4, AUT2, HU1, UPT2, UPT1, UPCX3 and UP. The system therefore changes to Up Peak operation.

Assume again that the system is on Balanced operation and that there are 3 up hall calls, no down calls and no car calls in the system. 1P and 2P are therefore the only current sensitive relays energized. Again Up Peak operation will be put into effect, the circuit for UPT being 3P2, 2P1, 1N1, 2N1, and UPT.

Assume that as before there are three up hall calls, no down hall calls and four down car calls. 1P, 2P and 1N are thereby energized. A circuit is thereby established for HUT through UPP3, DPP2, 3P4, 2P3, 1N2 and 2N4. HUT closes HUT1 and HUT2. Assuming the system had been on Balanced operation, however, HU would not immediately be brought in and the program would not change immediately. The reason for this is that BA2 in the circuit for HU remains open as long as BA remains energized. BA remains energized for some time after BAT drops out because BAT1 are timed contacts and will not open for a certain period after their relay drops out. When BAT1 does open, BA drops out, BA2 closes, HU is energized and the system goes on Heavier up program.

It will be seen that a similar arrangement to that just described has been made for each of the other programs. The net effect is to prevent an immediate shift from one program to an adjacent program in the series Up Peak
Heavier Up
Balanced
Heavier Down
Down Peak This prevents undue fluctuation in the program selection. Note, however, that a change from one program to another which is not adjacent to the first program, in the above series, can be done immediately. For example, if a shift from Balanced to Up Peak is indicated, the fact that BAT1 does not open immediately will not prevent UP from being energized when UPT is brought in.

It should also be noted that when a peak program is called for by the load weighing device such requirement supersedes the program indicated by the traffic computer. Thus an Up Peak signal from the load weighing system opens UPP3 and deenergizes the DPT, HUT, BAT and HDT relays. Similarly a Down Peak signal from the load weighing device opens DPP2 and DPP4. DPP2 prevents HUT, BAT and HDT being energized. DPP4 prevents the traffic computer contacts from bringing in UPT.

When there is no service demand in the system, all of the P and N relays will drop out. Assuming there are not two cars traveling in the same direction fully loaded (unlikely with no calls in the system) none of relays UPT, HUT, BAT, HDT or DPT will be energized. After a time whichever of contacts UPT1, HUT1, BAT1, HDT1, or DPT1 had last been closed will open, dropping out the appropriate program relay UP, HU, BA, HD or DP. With all these relays out, contacts UP3, HU5, BA5, HD5, and DP7 will be closed. Assuming the OCC clock relay (of which more later) is not operative OCC1 will also be closed. Thus the OC relay will be energized putting the On Call program into effect.

As noted above, clocks are provided for putting certain programs into existence at certain hours of the day regardless of the traffic computer or load weighing systems. These clocks function to close a mechanical switch at specified hours. The mechanical switch for putting Up Peak operation into effect is shown as UPC; Down Peak as DPC. A third clock OCC is provided for preventing the automatic program selector putting the On Call program into effect during certain hours.

Assuming the hour has arrived when the Up Peak program is to take effect, UPC closes UPC1, bringing in UPCX. The circuit goes through AUT1 which is closed with the system on automatic operation. UPCX closes UPC1 bringing in UP. At the same time it opens UPCX4 which prevents DPT, HUT, BAT or HDT from energizing any of the other program relays (i.e. DP, HU, BA, or HD).

When the time comes for Down Peak operation, DPC closes DPC1, bringing in DPCX. DPCX closes DPCX1 bringing in the Down Peak relay DP. DPCX2 is also opened, preventing energization of the other program relays.

During the normal business day, it may be desirable not to permit On Call operation to function. This is done by OCC which functions during normal business hours to open OCC1, preventing actuation of the OC relay.

A consideration of the foregoing specification shows that the present invention provides an integrated elevator system capable of functioning under a variety of conditions with a minimum amount of unnecessary travel. It is sensitive to traffic demands, and flexible enough to meet sudden unusual surges in traffic. It has built in features enabling it to maintain minimum service, even in the event of malfunction or failure of important elements.

It will be understood that many variations and additions may be made in and to the system specifically disclosed, without departing from the invention. For example, although the system has been described with respect to three cars, any number from two up may be employed. Similarly although the system has been described with respect to a ten floor building it may obviously function in any multistoried structure. Various other features, well known to the art may be incorporated, if desired, such for example as zoning, basement service and the like.

What we claim is:

1. In an elevator system wherein a plurality of elevator cars serve a terminal floor and a plurality of other floors, timing means operable to provide signals for dispatching cars from said terminal floor at timed intervals and means for preventing the movement of a car from said terminal floor unless a demand for service exists; in combination with means responsive to the load placed upon a car for dispatching said car from the terminal floor prior to the time a signal is given to said car.

2. In an elevator system wherein a plurality of elevator cars serve a terminal floor and a plurality of other floors, means for causing cars to stop at floors for which a service demand exists, timing means operable to give signals for dispatching cars from said terminal floor at timed intervals, means for preventing movement of said cars from said dispatching floor when no demand for service exists, and load sensitive means for causing movement of a fully loaded car from said dispatching floor before a signal has been given by said timing means, in combination with means for resetting said timing means when a car has been caused to move from said terminal floor by said load sensitive means.

3. In an elevator system wherein a plurality of elevator cars serve a plurality of floors, the improvement which comprises in combination, timing means operable to provide timed signals for use in dispatching said cars from a terminal floor, means for preventing the dispatching of a car from the terminal floor in the absence of a service demand and means for suspending movement of cars not at said terminal floor in the absence of a service demand.

4. The system claimed in claim 3 wherein operation of the timing means is suspended in the absence of a service demand.

5. In an elevator system comprising a plurality of elevator cars serving a plurality of floors, means for causing said cars to stop at floors for which a demand for service has been made, timing means operable to provide signals for dispatching cars from a terminal floor at timed intervals and means for suspending operation of said timing means when no demand for service exists.

6. In an elevator system comprising a plurality of elevator cars serving a bottom terminal floor and a plurality of upper floors, means for causing cars to stop at floors for which demands for service have been made, timing means operable to provide signals for dispatching cars from said bottom terminal floor at timed intervals and means for suspending movement of said cars and operation of said timing means when no demand for service exists and when a car is at said bottom terminal.

7. In an elevator system wherein a plurality of cars serve a terminal floor and a plurality of other floors, means for causing cars to stop at floors for which demands for service exist, timing means operable to give signals for dispatching cars from said terminal floor at timed intervals, means for preventing a car from being dispatched from said terminal floor if no demand for service exists; in combination with means for suspending movement of cars other than cars at said terminal floor, when no demand for service exists.

8. In an elevator system in which a plurality of cars travel between a bottom terminal floor and a plurality of upper floors, stopping at floors in response to demands for service; said system having a plurality of modes of operation including a first mode of operation whereby cars are dispatched upwardly from said bottom terminal, and downwardly from an upper floor by a dispatching mechanism, said dispatching mechanism including timing means operable to give dispatching signals at specified intervals, and a second mode of operation wherein cars are dispatched upwardly from said lower terminal by said dispatching mechanism and downwardly from an upper floor substantially immediately upon arrival at that floor; the improvement which comprises means operable during said second mode of operation for preventing said dispatching mechanism from dispatching cars from said lower terminal when a demand for service does not exist and means operable during said first mode of operation for suspending movement of cars and operation of said timing means when no call for service exists.

9. In an elevator system in which a plurality of cars travel between a bottom terminal floor and a plurality of upper floors stopping at floors in response to demands for service; said system having a plurality of modes of operation including a first mode of operation whereby cars are dispatched upwardly from said bottom terminal, and downwardly from an upper floor by a dispatching mechanism, said dispatching mechanism including timing means operable to give dispatching signals at specified intervals, and a second mode of operation wherein cars are dispatched upwardly from said lower terminal by said dispatching mechanism and downwardly from an upper floor substantially immediately upon arrival at that floor; the improvement which comprises means operable during said second mode of operation for preventing said dispatching mechanism from dispatching cars from said lower terminal when a demand for service does not exist and means operable during said first mode of operation for suspending movement of cars and operation of said timing means when no call for service exists and a car is at said bottom terminal.

10. The system claimed in claim 9 and including load sensitive means for dispatching a fully loaded car from said bottom terminal before a signal has been given by said timing means.

11. The system claimed in claim 10 and comprising means for resetting the timing means when a car has been dispatched from the terminal floor by the load sensitive means.

12. In an elevator system, wherein a plurality of elevator cars operate between a plurality of floors, means for registering demands for service originating at said floors and means, operable in response to the failure of said means for registering demands for service, for causing cars to stop at certain of said floors regardless of whether or not demands for service have originated at those floors.

13. In an elevator system, wherein a plurality of elevator cars operate between a terminal floor and a plurality of other floors, means for dispatching cars from said terminal floor, means for registering demands for service originating at said other floors, means for causing cars to stop at floors for which service has been demanded, means operable in response to the failure of said means for registering demands for service, to stop said cars at certain of said other floors regardless of whether or not a demand for service exists for said certain floors, and means for starting said cars from said terminal floor operable in response to the failure of said dispatching means.

14. In an elevator system wherein a plurality of elevator cars operate between a terminal floor and a plurality of other floors, means for registering demands for service originating at said other floors, means for causing cars to be dispatched from said terminal floor at timed intervals, provided there is a demand for service and means, responsive to the failure of said means for registering demands for service, for causing cars to be started from said terminal floor.

15. In an elevator system wherein a plurality of elevator cars serve a plurality of floors, means for registering floor calls, means for registering car calls and means, responsive to a failure of said means for registering hall calls, for registering false car calls.

16. In an elevator system wherein a plurality of elevator cars operate between a terminal floor and a plurality of other floors, means for registering floor calls, means for registering car calls, means for dispatching cars from said terminal floor provided there is a floor call or a car call registered and means, responsive to a failure of said means for registering floor calls, for registering false car calls thereby to cause said cars to be dispatched from said terminal floor and to stop at the floors for which said false calls are registered.

17. In an elevator system wherein a plurality of elevator cars operate between a terminal floor and a plurality of other floors, means for registering demands for service originating at said other floors, dispatching means for sending cars from said terminal floor at timed intervals provided a demand for service exists and means, responsive to the failure of said means for registering demands for service, for causing cars to be sent from said terminal floors, in combination with means, responsive to the failure of said dispatching means, for sending cars from said terminal floor.

18. In an elevator system wherein a plurality of elevator cars operate between a terminal floor and plurality of other floors, means for registering floor calls, means for registering car calls, means for dispatching cars from said terminal floor at timed intervals provided a call is registered, and means, responsive to the failure of said means for registering floor calls, for registering false car calls thereby enabling cars to be dispatched from said terminal floor, in combination with means, responsive to the failure of said dispatching means, for causing cars at said terminal floor to be sent therefrom.

19. In an elevator system having a plurality of modes of operation adapted to conform to the conditions where traffic is predominantly in the up direction, where traffic is heavier in the up direction than in the down direction, where the traffic is approximately equal up and down, where traffic is heavier down than up, and where traffic is predominantly down, means for measuring the service demand and means for immediately changing the mode of operation to conform to the service demand provided that the service demand requires a mode of operation at least two modes different from that in effect, with respect to the series

*a*. Predominantly up
    *b*. Heavier up than down
    *c*. Equal up and down
    *d*. Heavier down than up
    *e*. Predominantly down.

20. The system claimed in claim 19, and comprising means for preventing an immediate change from one program to an adjacent program in the series.

21. The system claimed in claim 19 and comprising means, responsive to a change in service demand, for changing from one program to an adjacent program in the series, after a time delay.

22. In an elevator system having a plurality of modes of operation, means responsive to service demand for changing the mode of operation of said system and means responsive to the load carried by said system for putting into effect certain modes of operation regardless of the service demand.

23. In an elevator system in which a plurality of cars serve a plurality of floors under a plurality of different modes of operation including a mode of operation adapted to give optimum service when the demand for service is intermittent, means responsive to the absence of a demand for service in the system, for putting said mode of operation into effect and clock means for preventing said mode of operation being put into effect during certain periods regardless of the demand for service.

24. In an elevator system having a plurality of cars operable under a plurality of programs, including an up-peak program adapted to give optimum service when the traffic is predominantly in the up direction, means for determining when the number of elevator cars traveling in the up direction while loaded to a predetermined degree reaches a specified number, and means responsive to said last named means for putting said up-peak program into effect when the number of cars loaded to said predetermined degree reaches said specified number.

25. In an elevator system having a plurality of elevator cars, operable under a plurality of programs, including a down-peak program adapted to give optimum service when the traffic is predominantly in the down direction, means for determining when the number of cars traveling in the down direction which are loaded to a predetermined degree reaches a specified number, and means responsive to said last named means for putting said down-peak program into effect when the number of cars loaded to said predetermined degree reaches said specified number.

26. In an elevator system having a plurality of cars operable under a plurality of programs, including an up-peak program adapted to give optimum service when the traffic is predominantly in the up direction and a down-peak program adapted to give optimum service when the traffic is predominantly in the down direction, first load sensitive means for determining whether the number of up traveling cars loaded to a predetermined degree has reached a predetermined minimum, second load sensitive means for determining whether the number of down traveling cars loaded to a predetermined degree has reached a predetermined minimum, first control means, operable when said first load sensitive means indicate that the number of up traveling cars has reached said minimum, for putting said up-peak program into effect and second control means operable when said second load sensitive means indicates the number of down traveling cars has reached said minimum, for putting said down-peak program into effect, provided the said first control means has not been operated.

27. In an elevator system wherein a plurality of cars serve a plurality of floors, including an upper terminal floor and a lower terminal floor, under a plurality of modes of operation, including a first mode of operation in which cars are dispatched from said lower terminal floor at timed intervals, provided there is a demand for service and are dispatched substantially immediately upon arrival at said upper terminal floor, and a second mode of operation wherein cars are dispatched at timed intervals from said upper terminal provided there is a demand for service and substantially immediately upon arrival at said lower terminal, means responsive to demands for service being predominantly in the up direction for rendering said first mode of operation effective, means responsive to demands for service being predominantly in the down direction for rendering said second mode of operation effective and load sensitive means, responsive to the number of loaded up traveling cars reaching a predetermined minimum, for rendering said first mode of operation effective, regardless of the demand for service.

28. The system claimed in claim 26 and comprising second load sensitive means, responsive to the number of loaded down traveling cars reaching a predetermined minimum, for rendering said second mode of operation effective, provided the load sensitive means previously referred to has not been actuated.

29. The system claimed in claim 28 and comprising clock means for putting said first mode of operation into effect regardless of the service demand and of the load sensitive means.

30. The system claimed in claim 28 and comprising clock means for putting said second mode of operation into effect regardless of the service demand and of the load sensitive means.

31. In an elevator system serving a plurality of floors and having a plurality of cars capable of operating on a plurality of programs, said system having means for registering up hall calls, means for registering down hall calls and means for registering car calls, a device for evaluating overall service demand which comprises a first set of current sensitive relays, a second set of current sensitive relays, means, responsive to the number of up hall calls and car calls in upwardly moving cars which have been registered, for controlling the current sent to said first set of current sensitive relays, and means responsive to the number of down hall calls and car calls in downwardly moving cars which have been registered, for controlling the current sent to said second set of current sensitive relays.

32. In an elevator system serving a plurality of floors and having a plurality of cars capable of operating on a plurality of programs, said system having means for registering up hall calls, means for registering down hall calls, and means for registering car calls, a device for selecting the program to be followed by said system, said device comprising a first current sensitive element and a second current sensitive element, each of said elements comprising a plurality of relays, the number of said relays actuated at any given time being dependent on the current delivered to the current sensitive element, means, responsive to the number of up hall calls and car calls for upwardly moving cars, for controlling the current delivered to said first current sensitive element, means, responsive to the number of down hall calls and car calls in downwardly moving cars registered, for controlling the current delivered to said second current sensitive element and means, responsive to the number of relays in each of said current sensitive elements which have been actuated, for selecting the program to be followed by said system.

33. The device claimed in claim 32 wherein the means for selecting the program to be followed is responsive to the difference in the number of relays actuated in said first and second current sensitive elements.

34. The device claimed in claim 32 wherein the means for controlling the current delivered to the current sensitive elements is more responsive to hall calls than to car calls.

35. In an elevator system having a plurality of cars serving a plurality of floors including an upper terminal floor, and a lower terminal floor, dispatching means for dispatching cars downwardly from said upper terminal floor and upwardly from said lower terminal floor, said dispatching means including a first timing device operable to give dispatching signals at predetermined intervals, and a second timing device operable to give dispatching signals at predetermined intervals different from the intervals of said first timing device; and means, responsive to a heavier demand for service in one direction than in the other, for determining which of said timing devices shall give dispatching signals at each of said terminals.

36. In an elevator system having a plurality of cars serving a plurality of floors including an upper terminal floor and a lower terminal floor, dispatching means for dispatching cars downwardly from said upper terminal floor and upwardly from said lower terminal floor, said dispatching means including a first timing device operable to give dispatching signals at predetermined intervals and a second timing device operable to give dispatching signals at predetermined intervals, shorter than the intervals of said first timing device, means operable when the traffic is heavier up than down for rendering signals from said second timing device effective for starting cars from said lower terminal but ineffective to start cars from said upper terminal; and to render said first timing device effective to start cars from the upper terminal but ineffective to start cars from the lower terminal.

37. In an elevator system having a plurality of cars serving a plurality of floors, including an upper terminal floor and a lower terminal floor, dispatching means for dispatching cars downwardly from said upper terminal floor and upwardly from said lower terminal floor, said dispatching means including a first timing device operable to give dispatching signals at predetermined intervals and a second timing device operable to give dispatching signals at predetermined intervals shorter than the intervals of said first timing device, means, operable when traffic is heavier down than up for rendering signals from said second timing device effective for starting cars from said upper terminal but ineffective for starting cars from said lower terminal; and to render said first timing device effective for starting cars from said lower terminal but ineffective for starting cars from said upper terminal.

38. In an elevator system comprising a plurality of cars serving an upper terminal floor, a lower terminal floor and a plurality of intermediate floors, dispatching means operable to give dispatching signals at timed intervals, means, responsive to demands for service requiring cars to travel predominantly in the up direction, for causing cars to be dispatched from said lower terminal floor by said dispatching device at timed intervals and for causing cars to be dispatched from said upper terminal immediately upon arrival at said upper terminal, and means responsive to demands for service which require heavier car travel in the up than in the down direction, but not predominantly in the up direction, for causing cars to be dispatched from said upper terminal floor by said dispatching device at timed intervals and from said lower floor at shorter intervals.

39. The system claimed in claim 38 and comprising means responsive to the number of loaded cars traveling in the up direction reaching a predetermined number for causing cars to be dispatched instantaneously from said upper terminal regardless of the demand for service.

40. The system claimed in claim 38 and comprising clock means for causing cars to be dispatched instantaneously from said upper terminal during certain periods regardless of the demand for service.

41. The system claimed in claim 38 and comprising means responsive to demands for service which are predominantly in the up direction, for causing cars to be reversed below said upper terminal floor, when there is no demand for service between them and said upper terminal floor.

42. In an elevator system wherein a plurality of elevator cars serve a terminal floor and a plurality of other floors, means including a timing mechanism operable to give dispatching signals at regular intervals of time for dispatching said cars from said terminal floor in the order of their arrival at said terminal floor and means for suspending operation of said timing mechanism in the absence of a demand for service.

43. In an elevator system wherein a plurality of elevator cars serve a terminal floor and a plurality of other floors, means for registering demands for service, selecting means for choosing from among cars available for dispatching from said terminal floor that car which first arrived at said terminal floor, as the next to leave said terminal floor, timing means for giving dispatching signals and means, operable when no demand for service has been registered, for suspending operation of said timing means.

44. In an elevator system wherein a plurality of elevator cars serve a terminal floor and a plurality of other floors, means for selecting from among cars available for dispatching from said terminal floor that car which first arrived at said terminal floor as the next to leave said terminal floor, means operable at regular intervals of time for dispatching a selected car from said terminal floor and means for preventing a car being dispatched from said terminal floor in the absence of a service demand.

45. In an elevator system wherein a plurality of elevator cars serve a terminal floor and a plurality of other floors, means for registering demands for service, means for selecting from among cars available for dispatching from said terminal floor, that car which first arrived at said terminal floor, timing means operable at regular intervals of time for giving a dispatching signal to a selected car, and means responsive to the absence of a registered service demand for preventing dispatch of a car from said terminal floor.

46. In an elevator system wherein a plurality of elevator cars serve a terminal floor and a plurality of other floors, means for registering demands for service, means for selecting, from among the cars available for dispatching from said terminal floor, that car which first arrived at said terminal floor, means for dispatching a selected car from said terminal floor and means for suspending movement of all cars when no demand for service has been registered and when there is a car available for dispatching at said terminal floor.

47. In an elevator system serving a plurality of floors and having a plurality of cars capable of operating under a plurality of programs, means for registering up hall calls, means for registering down hall calls, means for registering car calls, and means responsive to the relation between up hall calls and car calls in upwardly moving cars, on the one hand, and down hall calls and car calls in downwardly moving cars, on the other, for determining the program to be followed by said system.

48. In an elevator system serving a plurality of floors and having a plurality of cars capable of operating under a plurality of programs, including programs adapted for conditions where traffic is predominantly up, where traffic is predominantly down and where traffic is about equal up and down, means for registering up hall calls, means for registering down hall calls, means for registering car calls, traffic computer means for balancing the number of registered up hall calls and registered car calls in upwardly moving cars against the number of registered down hall calls and registered car calls in downwardly moving cars and means responsive to the balance determined by said traffic computer means for causing the system to follow one of said programs.

49. The system claimed in claim 48 wherein the available programs include a program adapted for conditions where traffic is heavier up than down, but not predominantly up and a program where traffic is heavier down than up, but not predominantly down.

References Cited in the file of this patent

UNITED STATES PATENTS

| | | |
|---|---|---|
| 2,492,010 | Santini | Dec. 20, 1949 |
| 2,652,903 | Borden | Sept. 22, 1953 |
| 2,695,077 | Suozzo | Nov. 23, 1954 |

Disclaimer 2,938,604.—*Joseph V. O'Grady*, Middletown Township, Monmouth County, and *Donald T. Moynihan*, Westfield, N.J. ELEVATOR CONTROL SYSTEM. Patent dated May 31, 1960. Disclaimer filed Jan. 22, 1962, by the assignee, *Montgomery Elevator Company*.

Hereby enters this disclaimer to claims 5, 6 and 43 of said patent.

[*Official Gazette April 3, 1962.*]